United States Patent
Ye et al.

(10) Patent No.: US 9,742,320 B2
(45) Date of Patent: Aug. 22, 2017

(54) TORQUE RIPPLE REDUCTION IN SWITCHED RELUCTANCE MOTOR DRIVES

(71) Applicant: McMaster University, Hamilton (CA)

(72) Inventors: Jin Ye, Hamilton (CA); Ali Emadi, Burlington (CA)

(73) Assignee: McMaster University, Hamilton (CA)

( * ) Notice: Subject to any disclaimer, the term of this patent is extended or adjusted under 35 U.S.C. 154(b) by 135 days.

(21) Appl. No.: 14/599,838

(22) Filed: Jan. 19, 2015

(65) Prior Publication Data

US 2015/0207439 A1    Jul. 23, 2015

Related U.S. Application Data

(60) Provisional application No. 61/928,693, filed on Jan. 17, 2014.

(51) Int. Cl.
*H02K 29/06* (2006.01)
*H02P 6/10* (2006.01)
(Continued)

(52) U.S. Cl.
CPC ............. *H02P 6/10* (2013.01); *H02P 25/098* (2016.02); *B62D 5/046* (2013.01); *H02P 6/14* (2013.01)

(58) Field of Classification Search
CPC ..... H02P 6/10; H02P 6/14; H02P 6/08; B62D 5/046; H02K 29/08
(Continued)

(56) References Cited

U.S. PATENT DOCUMENTS 8,080,969 B2    12/2011  Koenig
8,441,223 B2    5/2013   Ahn et al.
(Continued)

FOREIGN PATENT DOCUMENTS

EP    1617554    1/2006

OTHER PUBLICATIONS

Vujicic, "Minimization of Torque Ripple and Copper Losses in Switched Reluctance Drive", IEEE Trans. on Power Electron., vol. 27, No. 1, pp. 388-399, Jan. 2012.
(Continued)

*Primary Examiner* — Kawing Chan
*Assistant Examiner* — Bradley Brown
(74) *Attorney, Agent, or Firm* — Bereskin & Parr LLP/S.E.N.C.R.L., s.r.l.

(57) ABSTRACT

A method for controlling a switched reluctance motor, the method comprising: receiving a reference torque $T_{e\_ref}$; receiving an indication of a present rotor position θ for the switched reluctance motor; determining at least one of: a reference current $i_{e\_ref(k-1)}$ for a $(k-1)^{th}$ phase, a reference current $i_{e\_ref(k)}$ for a $(k)^{th}$ phase, and a reference current $i_{e\_ref(k+1)}$ for a $(k+1)^{th}$ phase; and outputting the determined at least one reference current to a current controller operatively coupled to the switched reluctance motor, wherein the determined at least one reference current is based on an objective function comprising the squares of phase current and derivatives of current reference.

4 Claims, 31 Drawing Sheets

(51) Int. Cl.
   *H02P 25/098* (2016.01)
   *H02P 6/14* (2016.01)
   *B62D 5/04* (2006.01)
(58) Field of Classification Search
   USPC .................................................. 318/400.23
   See application file for complete search history.

(56) References Cited

U.S. PATENT DOCUMENTS

2010/0315030 A1* 12/2010 Koenig ................. H02P 25/08
                                                          318/400.15
2012/0104986 A1*  5/2012 Ahn ..................... H02P 25/098
                                                          318/701

OTHER PUBLICATIONS

Ahn et al., "A Novel Torque Controller Design for High Speed SRM using Negative Torque Compensator", 8th International Conference on Power Electronics, Korea, May 30-Jun. 3, 2011.
Boyd, "Convex Optimization", pp. 215-218, Cambridge University Press, 2009.
Brauer et al., "Control for Polyphase Switched Reluctance Machines to Minimize Torque Ripple and Decrease Ohmic Machine Losses", IEEE Transactions on Power Electronics, vol. 27, No. 1, pp. 370-378, Jan. 2012.
Chayopitak et al., "An Adaptive Low-Ripple Torque Control of Switched Reluctance Motor for Small Electric Vehicle", Proc. International Conference on Electrical Machines and Systems, pp. 3327-3332, 2008, Wuhan, China.
Desai et al., "Novel Switched Reluctance Machine Configuration with Higher Number of Rotor Poles than Stator Poles: Concept to Implementation", IEEE Transactions on Industrial Electronics, vol. 57, No. 2, pp. 649-659, Feb. 2010.
Dowlatshahi et al., "Torque Ripple Minimization of Switched Reluctance Motor using Modified Torque Sharing Function", Proc. IEEE Iranian Conference on Electrical Engineering, pp. 1-6, 2013, Mashad, Iran.
Hannoun et al., "Design of an SRM Speed Control Strategy for a Wide Range of Operating Speeds", IEEE Transactions on Industrial Electronics, vol. 57, No. 9, pp. 2911-2921, Sep. 2010.
Husain, "Minimization of Torque Ripple in Srm Drives", IEEE Transactions on Industrial Electronics, vol. 49, No. 1, pp. 28-39, Feb. 2002.
Husain et al., "Torque Ripple Minimization in Switched Reluctance Motor Drives by PWM Current Control", IEEE Transactions Power Electronics, vol. 11, No. 1, pp. 72-77.
Husain et al., "Modeling, Simulation, and Control of Switched Reluctance Motor Drives", IEEE Transactions on Industrial Electronics, vol. 52, No. 6, pp. 1625-1634, Dec. 2005.
Inderka et al., "Control of Switched Reluctance Drives for Electric Vehicle Applications", IEEE Transactions on Industrial Electronics, vol. 49, No. 1, pp. 48-53, Feb. 2002.
Kim et al., "Single-Controllable-Switch-Based Switched Reluctance Motor Drive for Low Cost, Variable-Speed Applications", IEEE Transactions on Power Electronics, vol. 27, No. 1, pp. 379-387, Jan. 2012.
Kioskeridis et al., "Optimal Efficiency Control of Switched Reluctance Generators", IEEE Transactions on Power Electronics, vol. 21, No. 4, pp. 1062-1072, Jul. 2006.
Krishnamurthy et al., "Making the Case for Applications of Switched Reluctance Motor Technology in Automotive Products", IEEE Transactions on Power Electronics, vol. 21, No. 3, pp. 659-675, May 2006.
Krishnan, "Switched Reluctance Motor Drives: Modeling, Simulation, Analysis, Design, and Applications", CRC Press, Boca Raton, Florida, Jun. 2001.
Lee et al., "A Simple Nonlinear Logical Torque Sharing Function for Low-Torque Ripple SR Drive", IEEE Transaction on Industrial Electronics, vol. 56, No. 8, pp. 3021-3028, Aug. 2009.
Mademlis et al., "Performance Optimization in Switched Reluctance Motor Drives with Online Commutation Angle Control", IEEE Transactions on Energy Conversion, vol. 18, No. 3, pp. 448-457, Sep. 2003.
Mikail et al., "Four-Quadrant Torque Ripple Minimization of Switched Reluctance Machine through Current Profiling with Mitigation of Rotor Eccentricity Problem and Sensor Errors", Proc. IEEE Energy Conyers. Congress Expo, Raleigh, NC, pp. 838-842, 2012.
Mikail et al., "Torque-Ripple Minimization of Switched Reluctance Machines Through Current Profiling", IEEE Transactions on Industry Applications, vol. 49, No. 3, pp. 1258-1267, May/Jun. 2013.
Miller, "Electronic Control of Switched Reluctance Machines", New York: Reed Educational and Professional, pp. 1-8, 2001.
Pan et al., "An Improved Force Distribution Function for Linear Switched Reluctance Motor on Force Ripple Minimization with Nonlinear Inductance Modeling", IEEE Transactions on Magnetics, vol. 48, No. 11, pp. 3064-3067, Nov. 2012.
Park et al., "A Non-unity Torque Sharing Function for Torque Ripple Minimization of Switched Reluctance Generators", Proc. European Conference on Power Electronics and Applications (EPE), Lille, France, pp. 1-10, 2013.
Pop et al., "Comparative Study of Different Torque Sharing Functions for Losses Minimization in Switched Reluctance Motors Used in Electric Vehicles Propulsion", Proc. International Conference on Optimization of Electrical and Electronic Equipment (OPTIM), Brasov, pp. 356-365, 2012.
Sahoo et al., "A Lyapunov Function-Based Robust Direct Torque Controller for a Switched Reluctance Motor Drive System", IEEE Transactions on Power Electronics, vol. 27, No. 2, pp. 555-564, Feb. 2012.
Sahoo et al., "Iterative Learning-Based High-Performance Current Controller for Switched Reluctance Motors", IEEE Transactions on Energy Conversion, vol. 19, No. 3, pp. 491-498.
Sahoo et al., "Indirect Torque Control of Switched Reluctance Motors Using Iterative Learning Control", IEEE Transactions on Power Electronics, vol. 20, No. 1, pp. 200-208, Jan. 2005.
Schramm et al., "Torque Ripple Reduction of Switched Reluctance Motors by Phase Current Optimal Profiling", Proc. IEEE Power Electron. Spec. Conf. (PESC), Toledo, Spain, pp. 857-860, 1992.
Shaked et al., "New Procedures for Minimizing the Torque Ripple in Switched Reluctance Motors by Optimizing the Phase-Current Profile", IEEE Transactions on Magnetics, vol. 41, No. 3, pp. 1184-1192, Mar. 2005.
Spong et al., "Instantaneous Torque Control of Electric Motor Drives", IEEE Transactions Power Electron., vol. 2, No. 1, pp. 42-48, Jan. 1987.
Vujicic, "Modeling of a Switched Reluctance Machine Based on the Invertible Torque Function", IEEE Transactions on Magnetics, vol. 44, No. 9, pp. 2186-2194, Sep. 2008.
Wallace et al., "A Balanced Commutator for Switched Reluctance Motors to Reduce Torque Ripple", IEEE Transactions on Power Electronics, vol. 7, No. 4, pp. 617-626, Oct. 1992.
Xue et al., "Multi-Objective Optimization Design of In-Wheel Switched Reluctance Motors in Electric Vehicles", IEEE Transactions on Industrial Electronics, vol. 57, No. 9, pp. 2980-2987, Sep. 2010.
Xue et al., "Optimization and Evaluation of Torque-sharing Functions for Torque Ripple Minimization in Switched Reluctance Motor Drives", IEEE Transactions on Power Electronics, vol. 24, No. 9, pp. 2076-2090, Sep. 2009.
Ye et al., An Extended-Speed Low-Ripple Torque Control of Switched Reluctance Motor Drives, IEEE Transactions on Power Electronics, vol. 30, No. 3, pp. 1457-1470, Mar. 2015.
Ye et al., "Elimination of Mutual Flux Effect on Rotor Position Estimation of Switched Reluctance Motor Drives", IEEE Transactions on Power Electronics, vol. 30, No. 3, pp. 1499-1512, Mar. 2015.

* cited by examiner

TORQUE RIPPLE REDUCTION IN SWITCHED RELUCTANCE MOTOR DRIVES

FIELD

Embodiments disclosed herein relate generally to torque sharing functions (TSF), and more particularly to TSFs for torque ripple reduction and efficiency improvement in switched reluctance motor (SRM) drives.

BACKGROUND

Hybrid vehicles (e.g. vehicles with more than one power source for supplying power to move the vehicle) may provide increased efficiency and/or increased fuel economy when compared to vehicles powered by a single internal combustion engine.

Switched reluctance motor (SRM) drives are gaining interest in hybrid (HEV) and Plug-in Hybrid Electric Vehicle (PHEV) applications due to its simple and rigid structure, four-quadrant operation, and extended-speed constant-power range. However, SRM drives generally suffer from high commutation torque ripple, typically resulting from poor tracking precision of phase current, nonlinear inductance profiles, and nonlinear torque-current-rotor position characteristics.

BRIEF DESCRIPTION OF THE DRAWINGS

For a better understanding of the described embodiments and to show more clearly how they may be carried into effect, reference will now be made, by way of example, to the accompanying drawings in which.

Figure 1:
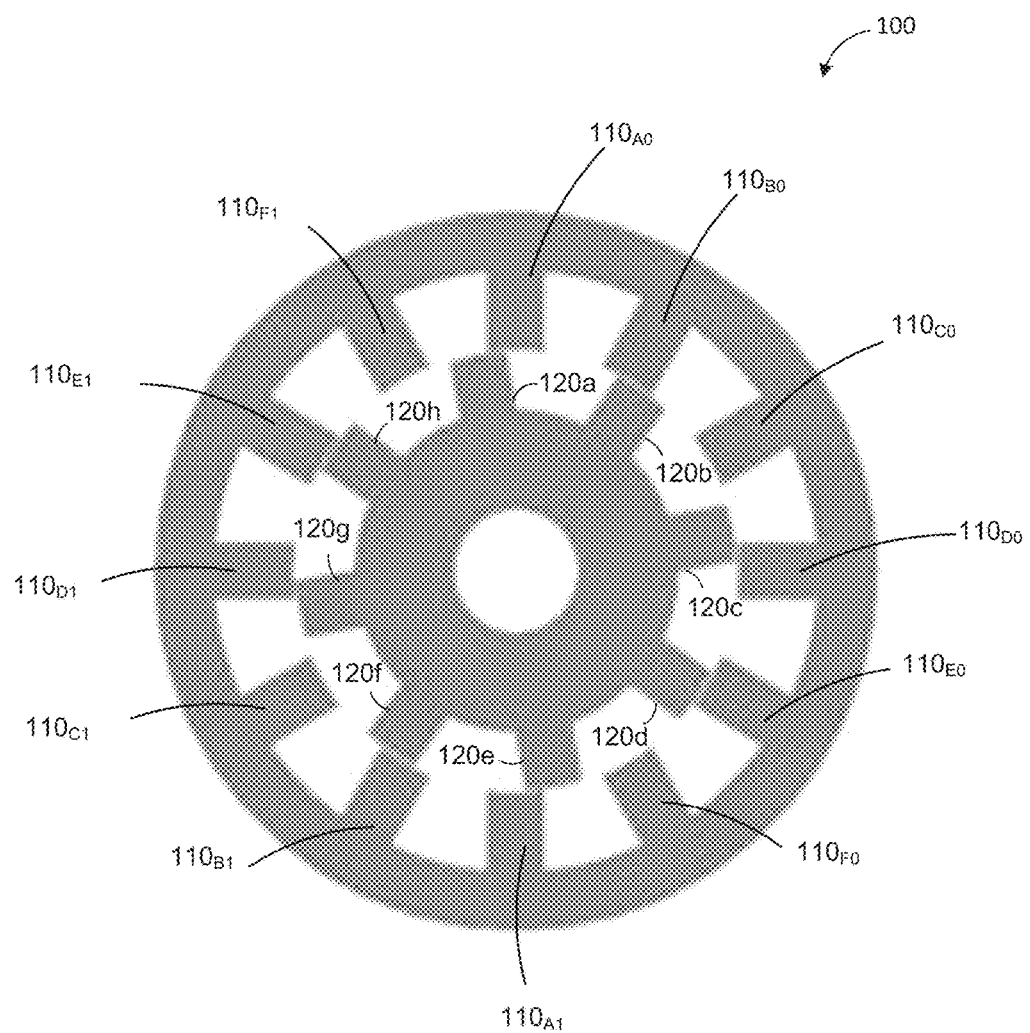
FIG. 1 is a schematic cross-section view of a switched reluctance motor.

Further aspects and features of the embodiments described herein will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

DESCRIPTION OF EXAMPLE EMBODIMENTS

Various systems or methods are described below to provide an example of an embodiment of each claimed invention. No embodiment described below limits any claimed invention and any claimed invention may cover systems and methods that differ from those described below. The claimed inventions are not limited to systems and methods having all of the features of any one system or method described below or to features common to multiple or all of the systems or methods described below. It is possible that a system or method described below is not an embodiment of any claimed invention. Any invention disclosed in a system or method described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Switched reluctance motor (SRM) drives are gaining interest in hybrid (HEV) and Plug-in Hybrid Electric Vehicle (PHEV) applications due to its simple and rigid structure, four-quadrant operation, and extended-speed constant-power range. SRM drives have generally been considered to be reliable and cost effective in harsh environments due to, for example, the absence of windings and permanent magnet on the rotor. But SRM drives generally suffer from high commutation torque ripple, typically resulting from poor tracking precision of phase current, nonlinear inductance profiles, and nonlinear torque-current-rotor position characteristics.

In typical TSFs, a torque reference is distributed among the motor phases, and the sum of the torque contributed by each phase is equal to the total reference torque. Then the reference phase current can be derived using the torque-current-rotor position characteristics of the particular SRM being driven.

Conventional torque sharing functions (TSFs) for SRMs include linear, sinusoidal, quadratic, cubic, and exponential TSFs. The secondary objectives for the selection of a particular TSF include: i) minimizing the copper loss, and ii) enhancing the torque-speed capability.

Selection of a torque sharing function will influence the phase current reference, and therefore the copper loss (which may also be referred to as the power loss) of the electric machine. Also, in order to track the torque reference, the effective rate of change of flux linkage should be minimized to extend the torque-speed range. Otherwise, with very limited DC-link voltage, phase current may be unable to track the reference perfectly during high speed, and therefore torque ripple increases with the rotating speed. However, the turn-off angle of conventional TSFs is typically defined only at the positive torque production area, which can lead to higher rate of change flux linkage with respect to rotor position. Thus, conventional TSFs generally have a relatively limited torque-ripple-free speed range.

A TSF can be characterized as either offline or online. For example, some TSFs are tuned online by using estimated torque or speed feedback, and they typically require additional parameters.

As disclosed herein, a new family of offline TSFs for torque ripple reduction and efficiency improvement of SRM drives over wide speed range has been developed. The objective function of the proposed TSFs is composed of two secondary objectives with a Tikhonov factor, in an effort to minimize the square of phase current (copper loss) and derivatives of current references (rate of change of flux linkage). The derivatives of current references are minimized to achieve better tracking precision of the torque reference during high speed, and therefore, to increase the torque-ripple-free speed range of the SRM.

A family of proposed TSFs may be obtained with different Tikhonov factors by using the method of Lagrange multipliers. Performance of conventional TSFs and at least some of the family of proposed TSFs were compared in terms of efficiency and torque-speed performance over a wide speed range. Simulation and experimental results—using a 2.3 kW three-phase, 6000 rpm, 12/8 SRM—are provided herein to provide examples of the performance of the proposed family of TSFs. These results indicate that the proposed TSFs are capable of reducing both the torque ripple and copper loss of a SRM over a relatively wide speed range.

In one broad aspect, there is provided a method for controlling a switched reluctance motor, the method comprising: receiving a reference torque $T_{e\_ref}$; receiving an indication of a present rotor position $\theta$ for the switched reluctance motor; determining at least one of: a reference current $i_{e\_ref(k-1)}$ for a $(k-1)^{th}$ phase, a reference current $i_{e\_ref(k)}$ for a $(k)^{th}$ phase, and a reference current $i_{e\_ref(k+1)}$ for a $(k+1)^{th}$ phase; and outputting the determined at least one reference current to a current controller operatively coupled to the switched reluctance motor, wherein the determined at least one reference current is based on an objective function comprising the squares of phase current and derivatives of current reference.

In some embodiments, the objective function comprises:

$$\min J = m i_{k-1}^2(\theta) + n i_k^2(\theta) + s\left[\frac{i_{k-1}(\theta) - i_{k-1}(\theta_0)}{\Delta\theta}\right]^2 + t\left[\frac{i_k(\theta) - i_k(\theta_0)}{\Delta\theta}\right]^2$$

subject to:

$$\frac{1}{2}\frac{\partial L(\theta, i_{k-1})}{\partial \theta}i_{k-1}^2(\theta) + \frac{1}{2}\frac{\partial L(\theta, i_k)}{\Delta\theta}i_k^2(\theta) = T_{e\_ref},$$

$$i_{k-1} \leq I_{max}, \text{ and}$$

$$i_k \leq I_{max};$$

wherein:
- $\theta_0$ is an indication of a previous rotor position for the switched reluctance motor,
- $i_{k-1}(\theta_0)$ is a reference current for an outgoing phase at the previous rotor position $\theta_0$,
- $i_{k-1}(\theta)$ is a reference current for the outgoing phase at the present rotor position $\theta$,
- $i_k(\theta_0)$ is a reference current for an incoming phase at the previous rotor position $\theta_0$,
- $i_k(\theta)$ is a reference current for the incoming phase at the present rotor position $\theta$,
- $\Delta\theta = \theta - \theta_0$,
- $L(\theta, i_k)$ is an incremental inductance for the switched reluctance motor for the incoming phase at the present rotor position $\theta$,
- $L(\theta, i_{k-1})$ is an incremental inductance for the switched reluctance motor for the outgoing phase at the present rotor position $\theta$,
- $I_{max}$ is an allowable peak current for the switched reluctance motor, and
- m, n, s, and t are Tikhonov factors.

In some embodiments, determining the at least one reference current comprises: determining at least one of: a reference torque $T_{e\_ref(n-1)}$ for a $(k-1)^{th}$ phase, a reference torque $T_{e\_ref(n)}$ for a $(k)^{th}$ phase, and a reference torque $T_{e\_ref(n+1)}$ for a $(k+1)^{th}$ phase; and using the determined at least one reference torque, the present rotor position $\theta$ for the switched reluctance motor, and a set of torque-current-rotor position characteristics to determine the at least one reference current.

These and other aspects and features of various embodiments will be described in greater detail below. While some examples discussed herein are directed to use of TSFs in hybrid vehicle applications, it will be appreciated that the torque-ripple-reduction techniques disclosed herein may be applied to any type of SRM drive.

Furthermore, the term 'hybrid vehicle' is to be interpreted broadly, and therefore may be applicable to vehicles including small passenger car, minivans, sports utility vehicles, pickup trucks, vans, buses, and trucks. Other applications may be possible, including off-road vehicles, tractors, mining and construction vehicles, hybrid boats and other naval applications.

Reference is now made to FIG. 1, which illustrates a schematic cross-section example of a three-phase 12/8 switched reluctance motor 100. The 12 stators 110 (e.g. salient pole stators) may be characterized as being grouped into 6 stator poles $110_{A0}$-$110_{A1}$, $110_{B0}$-$110_{B1}$, $110_{C0}$-$110_{C1}$, $110_{D0}$-$110_{D1}$, $110_{E0}$-$110_{E1}$, and $110_{F0}$-$110_{F1}$. A salient-pole rotor (which may be a solid rotor) has 8 projecting magnetic poles 120a-h, which may be made from a soft magnetic material (e.g. steel).

Where a SRM has salient pole construction both in its rotor and stator, the airgap and the phase inductance varies with rotor position. When a phase is energized, the rotor pole is pulled towards the stator pole to reduce the magnetic reluctance. Neglecting the mutual inductance of SRM, the equivalent circuit model of SRM can be represented by the following equations:

$$v = Ri + \frac{\partial \lambda(\theta, i)}{\partial i}\frac{di}{dt} + \frac{\partial \lambda(\theta, i)}{\partial \theta}\omega_m \quad (1)$$

$$L(\theta, i) = \frac{\partial \lambda(\theta, i)}{\partial i}$$

$$e(\theta, i, \omega_m) = \frac{\partial \lambda(\theta, i)}{\partial \theta}\omega_m$$

where v is phase voltage, i is phase current, R is resistance of winding, $\lambda$ is flux linkage, $\theta$ is rotor position (i.e. angular position of the SRM rotor), $L(\theta, i)$ is incremental inductance, $e(\theta, i, \omega_m)$ is back EMF, and $\omega_m$ is angular speed of the SRM.

Neglecting the magnetic saturation, (1) can be rewritten as:

$$v = Ri + L(\theta, i)\frac{di}{dt} + \frac{dL(\theta, i)}{d\theta}\omega_m i(\theta) \quad (2)$$

Electromagnetic torque of k-th phase can be derived as:

$$T_{e(k)}(\theta, i) = \frac{1}{2}\frac{\partial L(\theta, i_k)}{\partial \theta}i_k^2 \quad (3)$$

where $T_{e(k)}$ is the torque produced by the k-th phase, and $i_k$ is the k-th phase current.

For a n-phase SRM, total electromagnetic torque $T_e$ can be represented as:

$$T_e = \sum_{k=1}^{n} T_{e(k)} \quad (4)$$

The dynamics of SRM can be represented as:

$$T_e = T_L + \beta\omega_m + J\frac{d\omega_m}{dt} \quad (5)$$

where $T_L$ is the load torque, B is the total ratio, and J is the total moment of inertia.

Figure 2:
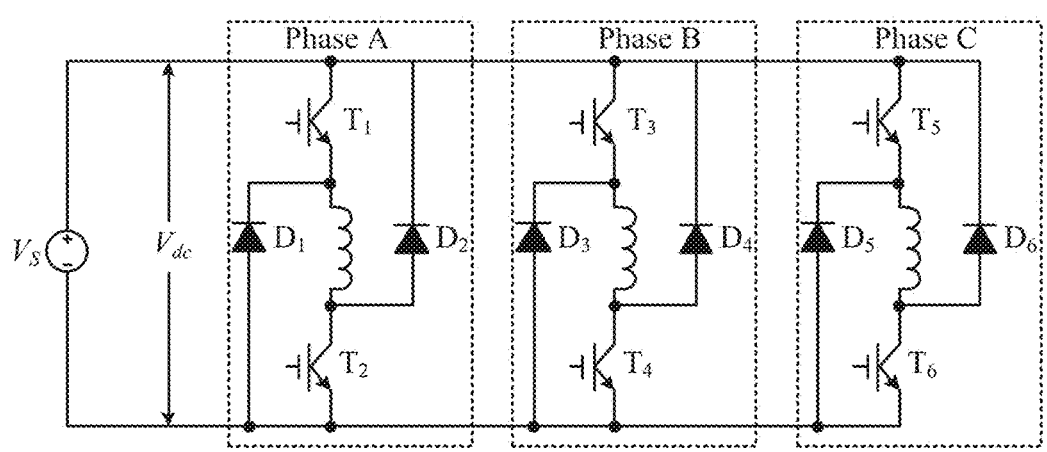
FIG. 2 is a circuit diagram for an asymmetric bridge converter in accordance with at least one example embodiment.

An example asymmetric power electronic converter for a SRM is shown in FIG. 2. It will be appreciated that functionally equivalent circuits (e.g. with more or fewer components) may be used. For example, a circuit with a (n+1) switch and diode configuration, or a variant thereof, may be used.

Figure 3A:
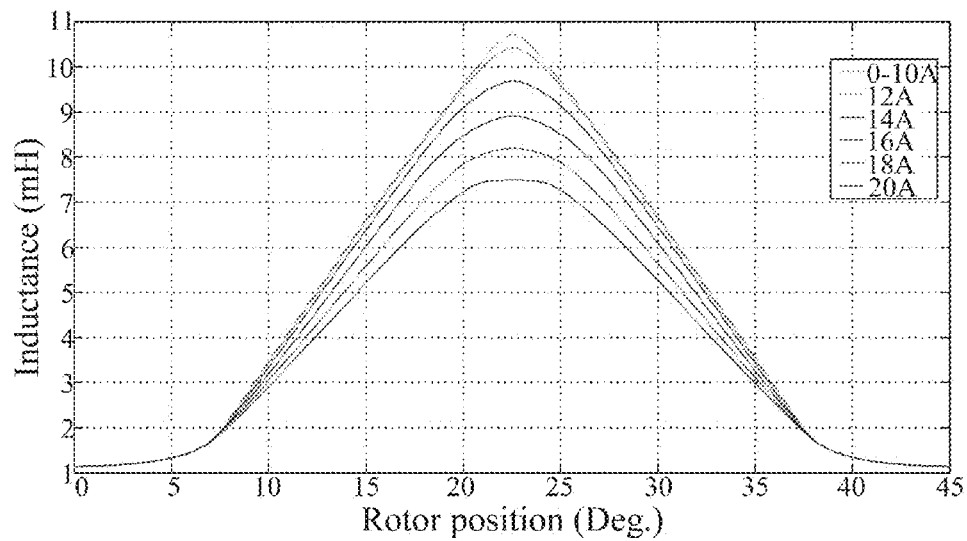
FIG. 3A is an inductance profile for an example 12/8 SRM.
Figure 3B:
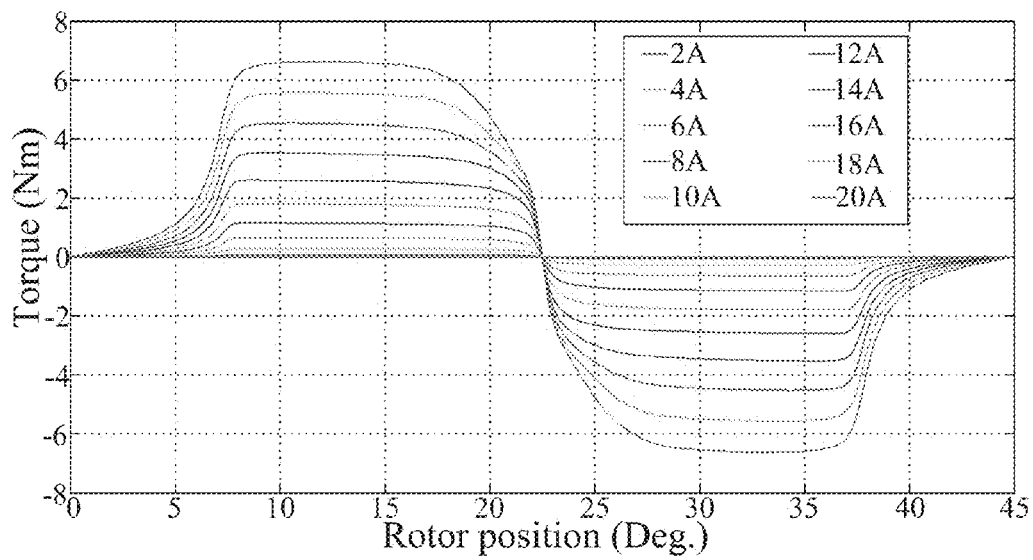
FIG. 3B is a torque profile for an example 12/8 SRM.

The inductance and torque profiles of the 12/8 SRM used for both simulation and experiment are position dependent and nonlinear, as shown in FIG. 3A and FIG. 3B, respectively.

Figure 4:
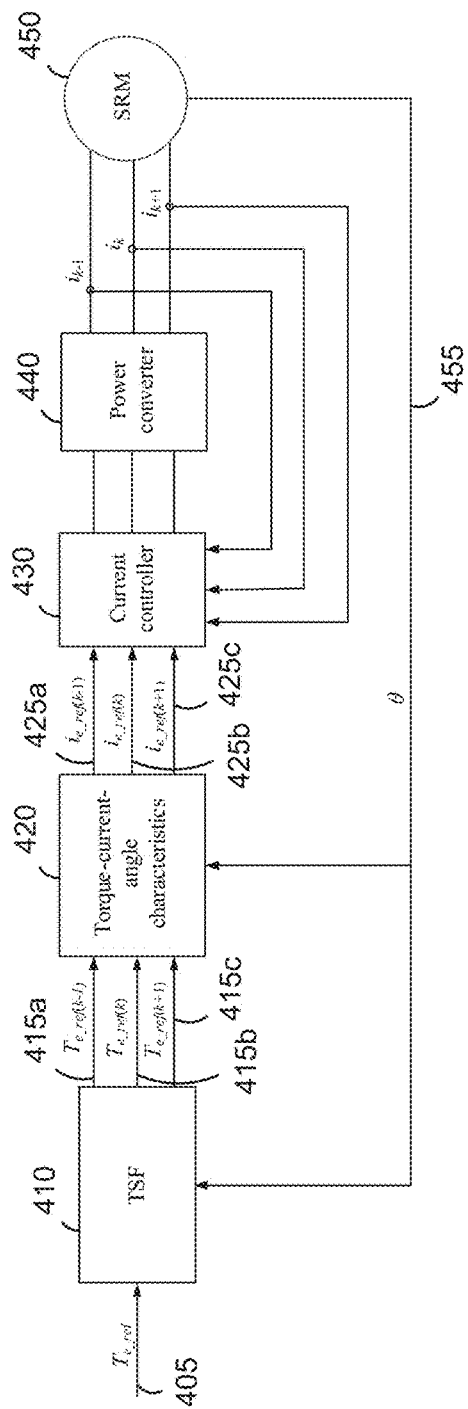
FIG. 4 is a schematic SRM torque control diagram in accordance with at least one example embodiment.

Turning to FIG. 4, a schematic SRM torque control diagram is shown generally as 400. In the illustrated example, an input (or desired) torque reference 405 is distributed to three phases based on values determined using a TSF 410 for a given rotor position $\theta$. These individual phase torque references 415a, 415b, and 415c (as defined by the TSF) are then converted to phase current references 425a, 425b, 425c according to torque-current-rotor position characteristics 420 of the SRM motor 450. Finally, the phase current is controlled by a hysteresis controller 430. A power converter 440 may be provided.

It will be appreciated that the individual phase torque references 415a, 415b, and 415c for a given torque reference 405 and rotor position $\theta$ may be pre-determined and stored in one or more look-up tables, for example using a field-programmable gate array (FPGA), a digital signal processor (DSP), and/or other suitable controller.

Similarly, the phase current reference (e.g. 425a, 425b, 425c) for a given phase torque reference (e.g. 415a, 415b, and 415c) and rotor position $\theta$ may be pre-determined and stored in one or more look-up tables, for example using a FPGA or other suitable controller.

Also, in some embodiments, the torque-current-rotor position characteristics 420 may be taken into consideration when determining individual phase current references 425a, 425b, and 425c based on the TSF. For example, three look-up tables—from which an individual phase current reference (e.g. 425a, 425b, 425c) can be retrieved for an individual phase torque reference (e.g. 415a, 415b, and 415c) and rotor position $\theta$—may be used.

For three-phase SRM, no more than two phases are conducted simultaneously. During the commutation, the torque reference of incoming phase is rising to the total torque reference gradually, and the torque reference of outgoing phase decreases to zero correspondingly. Only one phase is active when there is no commutation. The torque reference of k-th phase is defined as in:

$$T_{e\_ref(k)} = \begin{cases} 0 & 0 \le \theta < \theta_{on} \\ T_{e\_ref}f_{rise}(\theta) & \theta_{on} \le \theta < \theta_{on} + \theta_{ov} \\ T_{e\_ref} & \theta_{on} + \theta_{ov} \le \theta < \theta_{off} \\ T_{e\_ref}f_{fall}(\theta) & \theta_{off} \le \theta < \theta_{off} + \theta_{ov} \\ 0 & \theta_{off} + \theta_{ov} \le \theta \le \theta_p \end{cases} \quad (6)$$

where $T_{e\_ref(k)}$ is the reference torque for the k-th phase, $T_{e\_ref}$ is total torque reference, $f_{rise}(\theta)$ is the rising TSF for the incoming phase, $f_{fall}(\theta)$ is the decreasing TSF for the outgoing phase, and $\theta_{on}$, $\theta_{off}$, $\theta_{ov}$ and $\theta_p$ are turn-on angle, turn-off angle, overlapping angle, and the pole pitch, respectively.

Pole pitch may be defined as (7) by using the number of rotor poles $N_p$:

$$\theta_p = \frac{2\pi}{N_p} \quad (7)$$

Conventional TSFs

Conventional TSFs include linear, cubic, and exponential TSFs. These TSFs may be generally summarized as follows.

Conventional TSF—Linear

Figure 5:
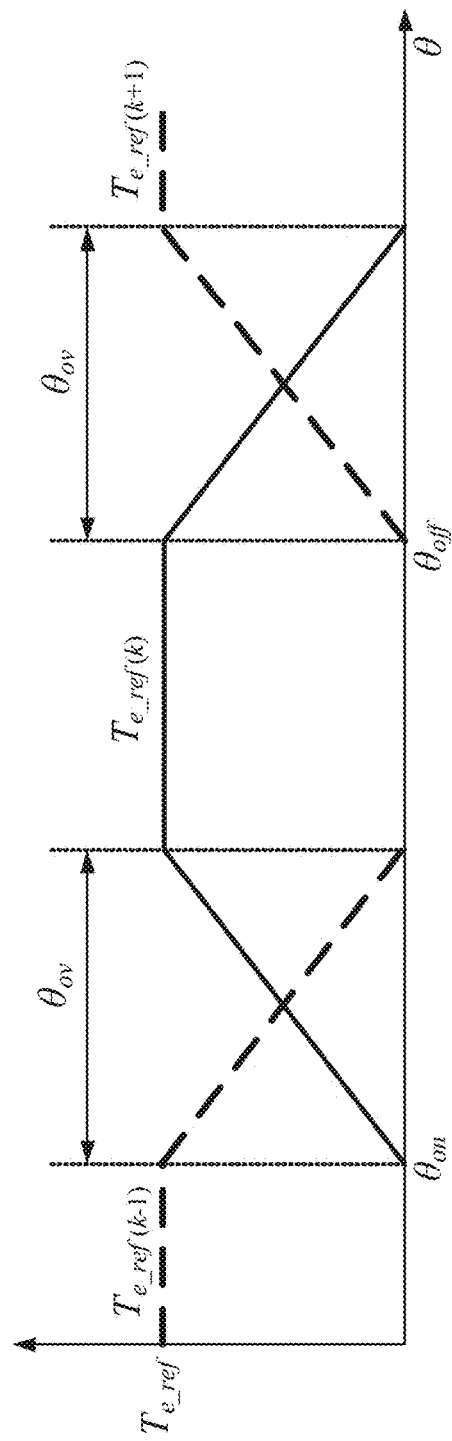
FIG. 5 is a representative waveform for the linear TSF.

Linear TSF may be represented as in (8), and an example of the linear TSF waveform is shown in FIG. 5. During commutation, the reference torque for the incoming phase is increasing linearly from 0 to 1, whereas the reference torque for the outgoing phase is decreasing linearly from 1 to 0.

$$f_{rise}(\theta) = \frac{1}{\theta_{ov}}(\theta - \theta_{on})$$
$$f_{fall}(\theta) = 1 - \frac{1}{\theta_{ov}}(\theta - \theta_{off}) \quad (8)$$

Conventional TSF—Cubic

The cubic TSF of the incoming phase may be represented as (9) with coefficients $\alpha_0$, $\alpha_1$, $\alpha_2$, and $\alpha_3$. It has to meet the constraints shown in (10).

$$f_{rise}(\theta) = \alpha_0 + \alpha_1(\theta - \theta_{on}) + \alpha_2(\theta - \theta_{on})^2 + \alpha_3(\theta - \theta_{on})^3 \quad (9)$$

$$f_{rise}(\theta) = \begin{cases} 0, & (\theta = \theta_{on}) \\ 1, & (\theta = \theta_{on} + \theta_{ov}) \end{cases} \quad (10)$$

$$\frac{df_{rise}(\theta)}{d\theta} = \begin{cases} 0, & (\theta = \theta_{on}) \\ 0, & (\theta = \theta_{on} + \theta_{ov}) \end{cases}$$

By substituting (9) into the constraints in (10), the coefficients of cubic TSF can be derived as:

$$\alpha_0 = 0;\ \alpha_1 = 0;\ \alpha_2 = \frac{3}{\theta_{ov}^2};\ \alpha_3 = \frac{-2}{\theta_{ov}^3} \quad (11)$$

Substituting (11) into (9), the cubic TSF can be expressed as:

$$f_{rise}(\theta) = \frac{3}{\theta_{ov}^2}(\theta - \theta_{on})^2 - \frac{2}{\theta_{ov}^3}(\theta - \theta_{on})^3$$
$$f_{fall}(\theta) = 1 - \frac{3}{\theta_{ov}^2}(\theta - \theta_{off})^2 - \frac{2}{\theta_{ov}^3}(\theta - \theta_{off})^3 \quad (12)$$

Figure 6:
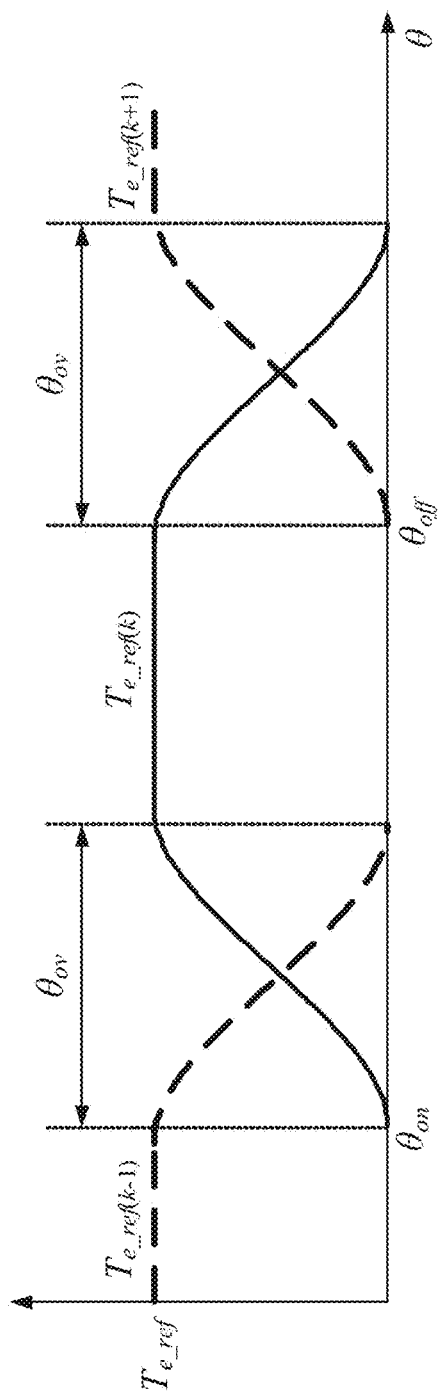
FIG. 6 is a representative waveform for the cubic TSF.

An example of the cubic TSF waveform is shown in FIG. 6.

Conventional TSF—Exponential

Exponential TSF may be defined as:

$$f_{rise}(\theta) = 1 - \exp\left(\frac{-(\theta - \theta_{on})^2}{\theta_{ov}}\right)$$
$$f_{fall}(\theta) = \exp\left(\frac{-(\theta - \theta_{off})^2}{\theta_{ov}}\right) \quad (13)$$

Evaluation Criteria for TSFs

To evaluate the torque-speed performance and efficiency of different TSFs, various criteria may be used, including: i) Rate of change of flux linkage with respect to rotor position; ii) Copper loss of the electric machine (which may be also be referred to as winding loss), and iii) torque ripple.

Regarding the rate of change of flux linkage with respect to rotor position, TSF is a good approach to minimize torque ripple of SRM during the commutation. However, the torque ripple is dependent on tracking precision of TSF defined by the current reference. To maximize ripple-free-torque speed region, the required DC-link voltage should be minimized. Therefore, the rate of change of flux linkage with respect to rotor position becomes an important criterion to evaluate the torque-speed performance of a specific TSF.

The maximum absolute value of rate of change of flux linkage $M_\lambda$ is defined as:

$$M_\lambda = \max\left\{\frac{d\lambda_{rise}}{d\theta}, -\frac{d\lambda_{fall}}{d\theta}\right\} \quad (14)$$

where $\lambda_{rise}$ is the rising flux linkage for the incoming phase, and $\lambda_{fall}$ is the decreasing flux linkage for the outgoing phase.

The maximum ripple-free speed could be derived as:

$$\omega_{max} = \frac{V_{dc}}{M_\lambda} \quad (15)$$

where $\omega_{max}$ is the maximum ripple-free speed, and $V_{dc}$ is the DC-link voltage.

Regarding the copper loss of the electric machine, copper loss is generally considered to be an important factor that influences efficiency of the electric machine. The RMS value of phase current $i_k$ and $i_{k-1}$ may be calculated between turn on angle $\theta_{on}$ and turn off angle $\theta_{off}$—and copper losses of two conducted phases may be averaged—and derived as:

$$I_{rms} = \sqrt{\frac{1}{2(\theta_{off} - \theta_{on})}\left(\int_{\theta_{on}}^{\theta_{off}} i_k^2 d\theta + \int_{\theta_{on}}^{\theta_{off}} i_{k-1}^2 d\theta\right)} \quad (16)$$

Regarding torque ripple, this may be defined as:

$$T_{rip} = \frac{T_{max} - T_{min}}{T_{av}} \quad (17)$$

where $T_{av}$, $T_{max}$, and $T_{min}$, are the average torque, maximum torque, and minimum torque, respectively.

Derivation of Proposed TSFs

A new family of proposed TSFs is described herein, which attempt to minimize torque ripple and copper loss of SRM drives over a relatively wide speed range (e.g. when compared to traditional TSFs). The objective function of the proposed TSFs directly combines the squares of phase current and derivatives of current reference with a Tikhonov factor. The derivatives of current references are minimized in an effort to achieve better tracking precision of the torque reference during high speed, and therefore, to maximize the torque-ripple-free speed range of the SRM. Lagrange multipliers are then applied to obtain proposed TSFs with different Tikhonov factors.

Two secondary objectives for selecting an appropriate TSF include copper loss minimization and torque speed performance enhancement. Copper loss for the incoming phase and outgoing phase can be expressed as the square of the reference currents:

$$P_{k-1} = R i_{k-1}^2(\theta) \tag{18}$$

$$P_k = R i_k^2(\theta) \tag{19}$$

where $P_{k-1}$ and $P_k$ represent the copper loss of the outgoing phase and the incoming phase, respectively, and R represents ohmic resistance.

It will be appreciated that, assuming R is constant, copper loss for the incoming phase and outgoing phase can alternatively be expressed as:

$$P_{k-1} = i_{k-1}^2(\theta) \tag{18b}$$

$$P_k = i_k^2(\theta) \tag{19b}$$

where $P_{k-1}$ and $P_k$ represent the copper loss of the outgoing phase and the incoming phase, respectively.

If copper losses of two conducted phases are minimized in each rotor position, RMS current in (16) can be minimized accordingly.

As discussed above, the actual torque is dependent on the tracking performance of two phases. Thus, if the rate of change of current reference is reduced (and preferably minimized), it will generally be easier for each phase to track its individual reference. Fewer torque ripples will be produced for higher motor speeds, and therefore the torque speed performance of a SRM controlled using a TSF that reduces the rate of change of current reference may be considered improved.

Accordingly, the torque speed performance of the proposed TSFs is expressed in terms of absolute rate of change of current reference, which should be reduced (and preferably minimized) in order to increase (and preferably maximize) the torque-ripple-free speed range of the SRM. As the derivatives of current reference may be negative, absolute derivatives of current references are considered to evaluate the torque speed performance. In order to simplify the mathematical expression of the absolute derivatives of current references, the square of the derivatives of current references is used as part of objective function of the proposed TSF to improve torque speed capability.

The derivatives of the current references of incoming phase and outgoing phase can be represented as:

$$d_{k-1} = \frac{i_{k-1}(\theta) - i_{k-1}(\theta_0)}{\Delta\theta} \tag{20}$$

$$d_k = \frac{i_k(\theta) - i_k(\theta_0)}{\Delta\theta} \tag{21}$$

where $i_{k-1}(\theta_0)$ and $i_{k-1}(\theta)$ are currents of the outgoing phase at the previous rotor position $\theta_0$ and present rotor position $\theta$, respectively; $i_k(\theta_0)$ and $i_k(\theta)$ are currents of the incoming phase at the previous rotor position $\theta_0$ and present rotor position $\theta$, respectively; and the variation of rotor position $\Delta\theta$ is defined as $\Delta\theta = \theta - \theta_0$.

The objective function of the proposed TSF combines both copper loss and square of derivatives of reference with Tikhonov factors. An objective function J may be initially defined as:

$$J = mRi_{k-1}^2(\theta) + nRi_k^2(\theta) + s\left[\frac{i_{k-1}(\theta) - i_{k-1}(\theta_0)}{\Delta\theta}\right]^2 + t\left[\frac{i_k(\theta) - i_k(\theta_0)}{\Delta\theta}\right]^2 \tag{22}$$

where m, n, s, and t are initial Tikhonov factors.

The objective function in (22) may be simplified to (23) by assuming that R and $\Delta\theta$ are constants.

$$J = ai_{k-1}^2(\theta) + bi_k^2(\theta) + c(i_{k-1}(\theta) - i_{k-1}(\theta_0))^2 + d(i_k(\theta) - i_k(\theta_0))^2 \tag{23}$$

where a, b, c, and d are all new Tikhonov factors. These parameters may be defined as:

$$a = Rm \tag{24}$$

$$b = Rm$$

$$c = \frac{s}{\Delta\theta^2}$$

$$d = \frac{t}{\Delta\theta^2}$$

It will be appreciated that an objective function J may alternatively be initially defined as:

$$J = mi_{k-1}^2(\theta) + ni_k^2(\theta) + s\left[\frac{i_{k-1}(\theta) - i_{k-1}(\theta_0)}{\Delta\theta}\right]^2 + t\left[\frac{i_k(\theta) - i_k(\theta_0)}{\Delta\theta}\right]^2 \tag{22b}$$

where m, n, s, and t are initial Tikhonov factors.

The objective function in (22b) may be simplified to (23b) by assuming that $\Delta\theta$ is constant.

$$J = ai_{k-1}^2(\theta) + bi_k^2(\theta) + c(i_{k-1}(\theta) - i_{k-1}(\theta_0))^2 + d(i_k(\theta) - i_k(\theta_0))^2 \tag{23b}$$

where a, b, c, and d are all new Tikhonov factors. These parameters may be defined as:

$$a = m \tag{24b}$$

$$b = n$$

$$c = \frac{s}{\Delta\theta^2}$$

$$d = \frac{t}{\Delta\theta^2}$$

According to the definition of a TSF, the sum of the torque reference for each of the two phases should be equal to the total torque reference (as the torque reference is shared between the phases). This equality constraint may be expressed as:

$$\frac{1}{2}\frac{\partial L(\theta, i_{k-1})}{\partial \theta}i_{k-1}^2(\theta) + \frac{1}{2}\frac{\partial L(\theta, i_k)}{\partial \theta}i_k^2(\theta) = T_{e\_ref} \tag{25}$$

Also, the current reference should not exceed the maximum allowable current (which may also be referred to as the allowable peak current, or maximum rated current, etc.) of the SRM being controlled using the TSF. Accordingly, additional inequality constraints may be expressed as:

$$i_{k-1} \leq I_{max} \tag{26}$$

$$i_k \leq I_{max} \tag{27}$$

where $I_{max}$ is the allowable peak current for the SRM.

Thus, the optimization problem may be represented as the objective function of the proposed TSF, subject to the equality constraints noted in (25), (26), and (27), and can be represented as:

$$\min J = ai_{k-1}^2(\theta) + bi_k^2(\theta) + c(i_{k-1}(\theta) - i_{k-1}(\theta_0))^2 + d(i_k(\theta) - i_k(\theta_0))^2 \quad$$

Subject to:

$$\begin{cases} \frac{1}{2}\frac{\partial L(\theta, i_{k-1})}{\partial \theta}i_{k-1}^2(\theta) + \frac{1}{2}\frac{\partial L(\theta, i_k)}{\partial \theta}i_k^2(\theta) = T_{e\_ref} \\ i_{k-1} \leq I_{max}; i_k \leq I_{max} \end{cases} \quad (28)$$

To solve the optimization problem in (28), the method of Lagrange multipliers may be applied. The basic idea of the method of Lagrange multipliers is to combine the objective function with a weighted sum of the constraints. For example, a Lagrange function with the optimization problem in (28) may be represented as:

$$L = ai_{k-1}^2(\theta) + bi_k^2(\theta) + c(i_{k-1}(\theta) - i_{k-1}(\theta_0))^2 + d(i_k(\theta) - i_k(\theta_0))^2 + \quad (29)$$
$$\lambda_1\left[\frac{1}{2}\frac{\partial L(\theta, i_{k-1})}{\partial \theta}i_{k-1}^2(\theta) + \frac{1}{2}\frac{\partial L(\theta, i_k)}{\partial \theta}i_k^2(\theta) - T_{e\_ref}\right] + $$
$$\lambda_2[i_{k-1}(\theta) - I_{max}] + \lambda_3[i_k(\theta) - I_{max}]$$

where $\lambda_1$, $\lambda_2$, and $\lambda_3$, are Lagrange multipliers.

According to the theory of Lagrange multipliers, the inequality constraints listed in (26) and (27) have to satisfy (30) and (31):

$$\lambda_2[i_{k-1}(\theta) - I_{max}] = 0 \quad (30)$$

$$\lambda_3[i_k(\theta) - I_{max}] = 0 \quad (31)$$

Supposing that all the inequality constraints are active:

$$\lambda_2 = 0; \lambda_3 = 0; i_{k-1}(\theta) < I_{max}; i_k(\theta) < I_{max} \quad (32)$$

According to the theory of Lagrange Multiplier the minimum point is obtained by solving:

$$\frac{\partial L}{\partial i_k(\theta)} = 0 \quad (33)$$

$$\frac{\partial L}{\partial i_{k-1}(\theta)} = 0$$

$$\frac{\partial L}{\partial \lambda_1} = 0$$

where (33) represents partial derivatives of the Lagrange function L with respect to $i_k$, $i_{k-1}$, and $\lambda_1$.

To solve for the minimum point of the objective function, one can first set the derivative of the Lagrange function with respect to the current of the incoming phase to be zero:

$$\frac{\partial L}{\partial i_k(\theta)} = 0 \quad (34)$$

Solving (34), (35) can be derived:

$$(2b + 2d + \lambda_1)i_k(\theta) = 2di_k(\theta_0) \quad (35)$$

Assuming $2b + 2d + \lambda_1 \neq 0$, (35) can be rewritten as (36). This assumption may be verified when $\lambda_1$ is obtained at the end.

$$i_k(\theta) = \frac{2d}{(2b + 2d + \lambda_1)}i_k(\theta_0) \quad (36)$$

Similarly, (37) can be derived for the outgoing phase:

$$i_{k-1}(\theta) = \frac{2c}{(2a + 2c + \lambda_1)}i_{k-1}(\theta_0) \quad (37)$$

Finally, substituting (36) and (37) into (25), Lagrange factor $\lambda_1$ may be obtained. By substituting this obtained $\lambda_1$ into (36) and (37), the current references of the incoming phase and the outgoing phase may be derived. If the values for these current references are no greater than the maximum rated current of the SRM to be controlled using the TSF, the current reference of the incoming phase and the outgoing phase satisfy the assumption in (32) and the current reference is confirmed.

Cases where the inequality constraints are not active need to be considered. For example, if the current reference of the outgoing phase is greater than the maximum current, inequality constraint in (26) is not active and (38) is satisfied:

$$\lambda_2 \neq 0 \quad (38)$$

Thus, in order to satisfy (30), the current reference of the outgoing phase is derived as:

$$i_{k-1}(\theta) = I_{max} \quad (39)$$

Substituting (39) into (25), the current reference for incoming phase may be derived as:

$$i_k(\theta) = \sqrt{\frac{T_{e\_ref} - \frac{1}{2}\frac{\partial L(\theta, i_{k-1})}{\partial \theta}I_{max}^2}{\frac{1}{2}\frac{\partial L(\theta, i_k)}{\partial \theta}}} \quad (40)$$

Similarly, if the current reference of the incoming phase is greater than the maximum current, the current reference of incoming phase is set to the maximum current, and the current reference of the outgoing phase may be derived as:

$$i_{k-1}(\theta) = \sqrt{\frac{T_{e\_ref} - \frac{1}{2}\frac{\partial L(\theta, i_k)}{\partial \theta}I_{max}^2}{\frac{1}{2}\frac{\partial L(\theta, i_{k-1})}{\partial \theta}}} \quad (41)$$

It should be noted that the initial value of the current reference should be set according to (36) and (37). Thus, for the proposed TSF, both turn on angle and initial value should be predefined, which is similar to conventional TSF. However, in conventional TSFs, the turn off (or overlapping) angle is only defined in advance at the positive torque production area. This may cause higher torque ripples at relatively higher speed ranges.

To avoid this problem, turn off (or overlapping) angle of the proposed TSF is adjusted according to a tradeoff between torque-speed capability and copper loss. Preferably, turn off (or overlapping) angle of the proposed TSF is adjusted so that turn-off angle can be extended to negative torque production areas. At lower speed, copper loss is typically more important, and thus the Tikhonov factors a and b for the squared current terms in the objective function (28) should be set larger. But as the speed of the SRM increases, torque ripple typically becomes more significant due to a high rate of change of current reference. Derivatives of current reference become more important factors, and thus the Tikhonov factors c and d for the squared current terms in the objective function (28) should be set larger. For example, if the SRM being driven has a relatively low operational speed (e.g. 500 rpm), it may be preferable to set a and b to be relatively high compared to c and d, whereas if the SRM being driven has a relatively higher operational speed (e.g. 5,000 rpm), it may be preferable to set c and d to be relatively high compared to a and b (as torque ripple may be a more significant concern than copper loss).

Selection of Tikhonov Factors

In order to solve the optimization problem in (28), the Tikhonov factors need to be determined. A Tikhonov factor indicates the importance of a certain objective. The relative difference between the selected values and the base value defines the importance of the objective function. For this purpose, the Tikhonov factor of derivative of incoming phase d may be set as 1. The ratio between the maximum absolute value of rate of change (ARCFL) of the outgoing phase and maximum ARCFL of the incoming phase may be expressed as:

$$r = \max\left(-\frac{d\lambda_{fall}}{d\theta}\right) / \max\left(-\frac{d\lambda_{rise}}{d\theta}\right) \quad (42)$$

Typically, the tracking performance of the outgoing phase is much poorer than that of the incoming phase. For example, r may be around 10 in a 12/8 SRM. In an effort to ensure that incoming phase and outgoing phase have relatively similar ARCFLs, the ARCFL of the outgoing phase may be minimized by r times. Also, since the ARCFL is represented as the derivative of the current reference in the objective function, the squared current reference of the outgoing phase may be reduced, and preferably minimized, by $r^2$ times. Therefore, the Tikhonov factor of the derivative of the outgoing phase current reference may be set to $r^2$ times as high as that of the incoming phase, i.e. $c=r^2 \times d=r^2$ (assuming d=1, as noted above). Then only a and b need to be defined. Since the Tikhonov factor of the derivative of outgoing phase (c) is set $r^2$ times as high as that of incoming phase (d), the Tikhonov factor of the squared current of outgoing phase (a) is preferably relatively higher than that of incoming phase (b). Otherwise, the relative importance of the square of outgoing phase current reference is decreased compared with the derivative of the outgoing phase current reference. This may increase the square of the current of the outgoing phase. Therefore, the Tikhonov factor of the square of the current of the outgoing phase may be, for example, set h (h>1) times as high as that of the incoming phase.

The selection of h is typically dependent on the characteristics of the particular SRM, and it will be appreciated that h is subject to change. (Put another way, as the selection of Tikhonov factors may be dependent on the characteristics of the particular SRM, there may be no general analytical expression for all SRMs.) For simplification, h may be initially set to r. If b is set to be the value q, the objective function in (28) may be simplified as:

$$J = q(ri_{k-1}^2(\theta) + i_k^2(\theta)) + r^2(i_{k-1}(\theta) - i_{k-1}(\theta_0))^2 + (i_k(\theta) - i_k(\theta_0))^2 \quad (43)$$

According to (43), q can be adjusted to balance between copper loss and the square of the current reference derivatives. For example, if the value of q is increased, the copper losses are emphasized.

In order to assist in selecting appropriate Tikhonov factors for a particular SRM (as the preferred Tikhonov factors may be motor dependent), another possible approach is to review and compare simulations of the performance of conventional TSFs in terms of copper loss and rate of change of flux linkage for a particular SRM as a basis for selecting the Tikhonov factors.

Figure 7:
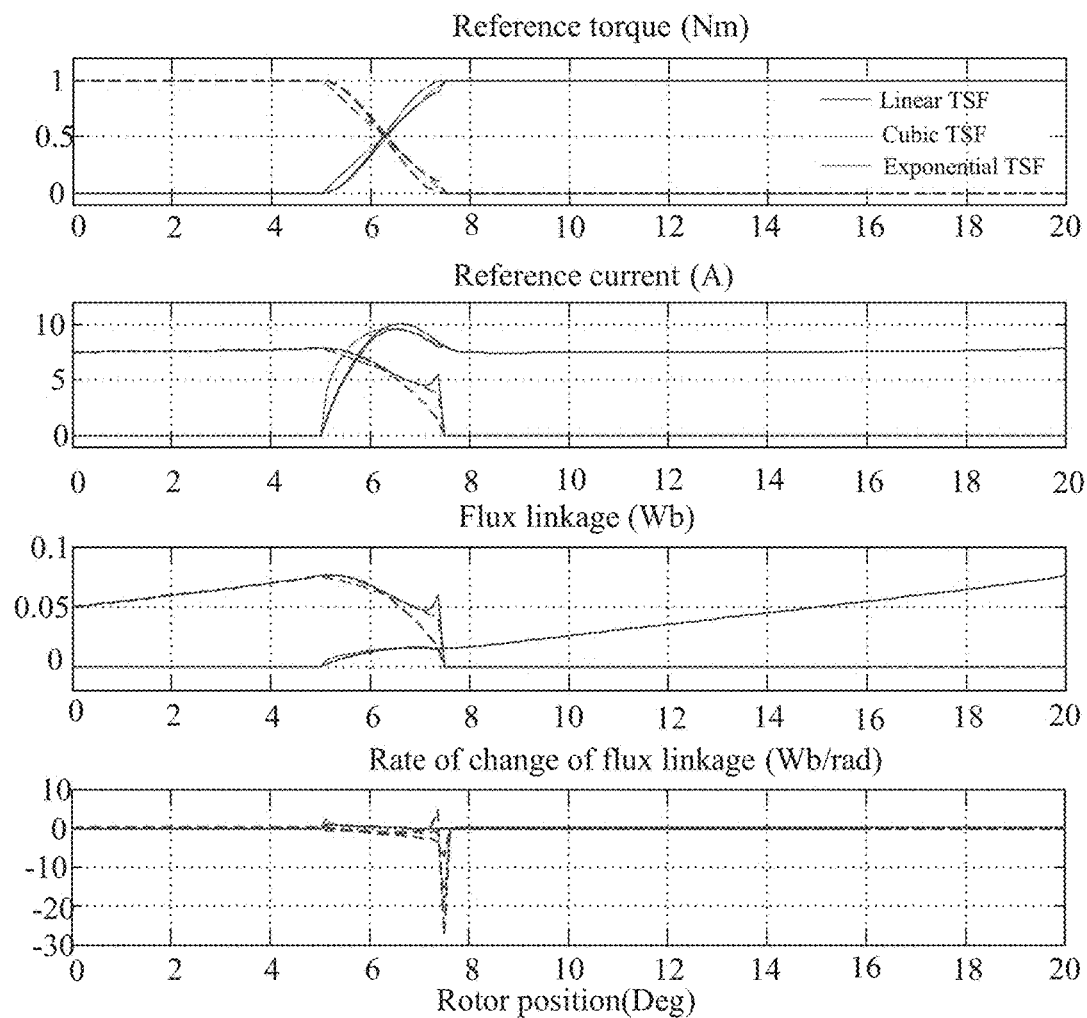
FIG. 7 shows calculated torque reference, current reference, flux linkage, and rate of change of flux linkage for linear, cubic, and exponential TSFs.

For example, a 2.3 kW three-phase 12/8 6000 rpm SRM with a DC-link voltage of 300 V may be considered for the comparison of TSFs. If the turn on angle $\theta_{on}$ for linear TSF, cubic TSF, and exponential TSF is set to 5°, the overlapping angle $\theta_{ov}$ is set to 2.5°, and the torque reference $T_{e\_ref}$ (e.g. torque reference 405 in FIG. 4) is set to 1 Nm, typical waveforms of reference torque, reference current, flux linkage, and rate of change of flux linkage in terms of rotor position may be determined, as shown in FIG. 7. (Here, the comparison was based on a Matlab/Simulink model for the SRM, which was built according to the characteristics of the SRM.)

As can be seen from FIG. 7, it appears that flux linkage varies with rotor position and shows sharp decrease at the end of commutation. Also, the absolute value of rate of change of flux linkage with respect to rotor position of outgoing phase is much higher than that of incoming phase in all three types of conventional torque sharing functions. Thus, the maximum torque-ripple-free speed is actually determined by the outgoing phase.

For example, as shown in FIG. 7, when the torque reference is set to 1 Nm, the maximum absolute value of rate of change of flux linkage $M_\lambda$ for linear TSF, cubic TSF, and exponential TSF is 18.8 Wb/rad, 7.15 Wb/rad, and 27.2 Wb/rad, respectively. Using equation (15), the maximum torque-ripple-free speed for linear TSF, cubic TSF, and exponential TSF may be calculated as 16 rad/s, 42 rad/s, and 11 rad/s, respectively. Put another way, the maximum torque-ripple-free speed for linear TSF, cubic TSF, and exponential TSF is only 152 rpm, 400 rpm, and 105 rpm, respectively. This suggests that among these three conventional TSFs, cubic TSF has the best torque-speed capability. But overall, the maximum torque-ripple-free speed of the best case using conventional TSFs is less than one tenth of the maximum speed of the machine. This suggests that the torque-speed capability of conventional TSFs may be characterized as very limited.

The new family of proposed TSFs described herein is capable of extending the torque-ripple-free speed range of a SRM. To solve the optimization problems in (28), the Tikhonov factors need to be determined in advance. While theoretical derivation of Tikhonov factors may be difficult, a preliminary selection of Tikhonov factors based on simulation results (e.g. FIG. 7) is given here.

As noted above, the simulation results shown in FIG. 7 suggest that the tracking performance of the outgoing phase is typically much poorer when compared to the tracking performance of the incoming phase. This suggests that reduction (arid preferably minimization) of the derivative of the outgoing phase is more significant than the reduction (and preferably minimization) of the derivative of the incoming phase. Thus, the Tikhonov factor for the derivative of outgoing phase (i.e. c) may be set to be significantly higher than the Tikhonov factor for the derivative of incoming phase (i.e. d), in an effort to significantly reduce the derivative of the current reference of the outgoing phase. For example, the Tikhonov factor of derivative of outgoing phase may be set 100 times higher than the Tikhonov factor for the derivative of incoming phase (e.g. c=100×d). For example, assuming for simplicity that the Tikhonov factor d is set to 1, the Tikhonov factor c may be set to 100.

Once the Tikhonov factors c and d have been determined, the two Tikhonov factors a and b need to be defined. If, as in the example above, the Tikhonov factor for the derivative of outgoing phase is much higher than the Tikhonov factor for the incoming phase, the Tikhonov factor for the copper loss associated with the outgoing phase (i.e. a) is preferably relatively higher than the Tikhonov factor for the copper loss associated with the incoming phase (i.e. a), so that the copper loss of the outgoing phase is not increased significantly. For example, the Tikhonov factor a for the copper loss of the outgoing phase may be set 10 times higher than the Tikhonov factor b for the copper loss of the incoming phase.

For example, if b is set to be the value q, and if d is set to 1 and c is set to 100, the objective function in (23) may be simplified as:

$$J = 10qi_{k-1}^2(\theta) + qi_k^2(\theta) + 100(i_{k-1}(\theta) - i_{k-1}(\theta_0))^2 + (i_k(\theta) - i_k(\theta_0))^2 \quad (44)$$

According to (44), q can be adjusted to make a tradeoff between copper loss and torque-speed capability.

Figure 8:
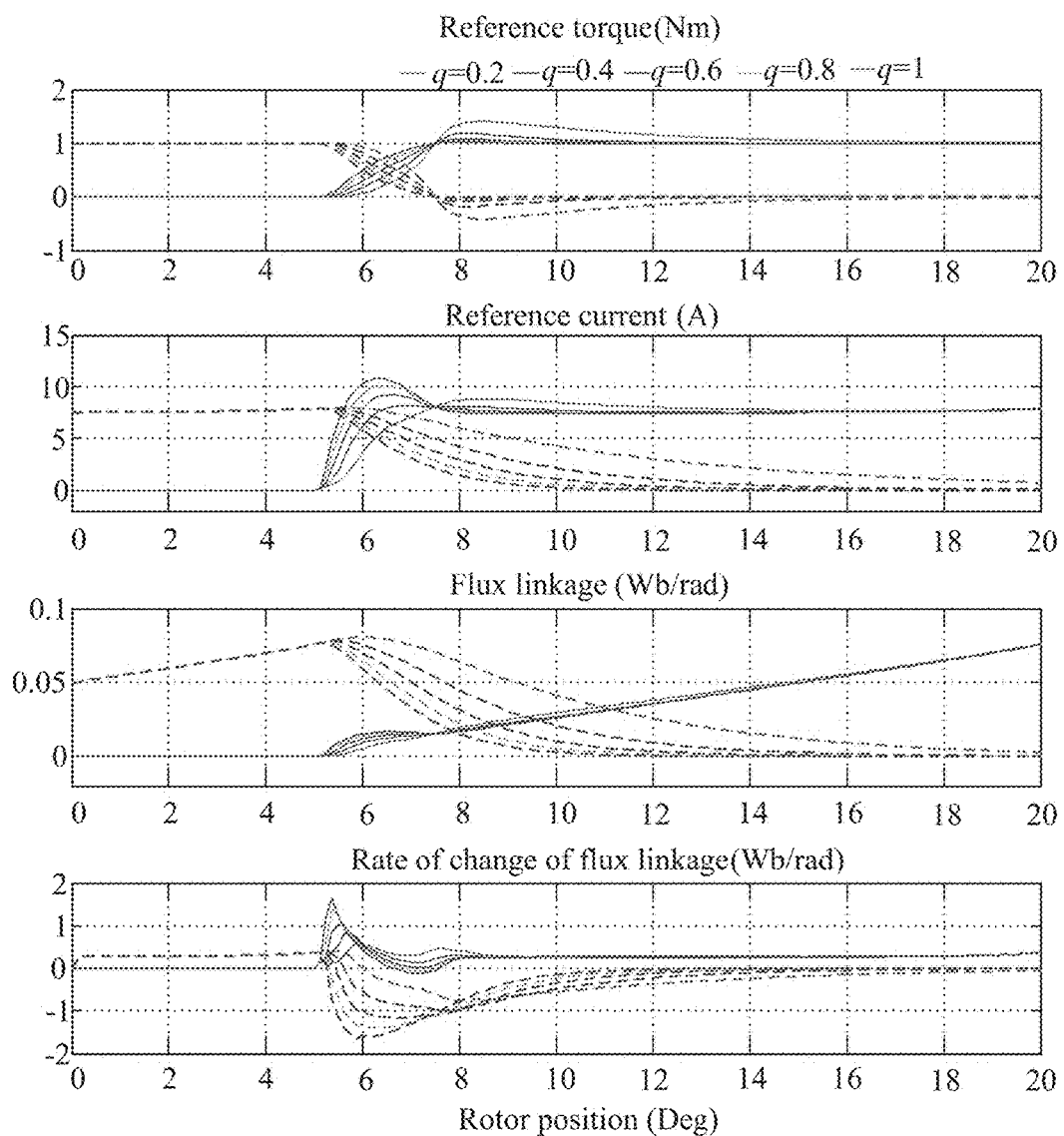
FIG. 8 shows calculated torque reference, current reference, flux linkage, and rate of change of flux linkage for proposed TSFs in accordance with at least one example embodiment.

For example, FIG. 8 shows example waveforms of reference torque, reference current, flux linkage, and rate of change of flux linkage of members of the proposed family of TSFs. When q=0.2, the current reference of the outgoing phase is not zero at the end of commutation. As a SRM works in a continuous conduction mode, this may result in a relatively high copper loss. When q=0.4, the current reference of outgoing phase decreases to zero at the end of commutation, and the overlapping angle of this mode is about 11°. As q increases to 1 (e.g. q=0.6, q=0.8, and q=1), the overlapping angle decreases to 5° and no significant negative torque is produced in this mode, which is similar to conventional TSFs.

By decreasing the value of q, the rate of change of current reference generally decreases. As a result, the overlapping region of the proposed TSF is increased. As can be seen by comparing FIG. 8 and FIG. 7, the flux linkage of the proposed TSFs changes much more smoothly than those of conventional TSFs, due to a relatively lower rate of change of the current reference. Also, as compared with conventional TSFs, the rate of change of flux linkage of the proposed TSFs is significantly reduced.

Figure 9:
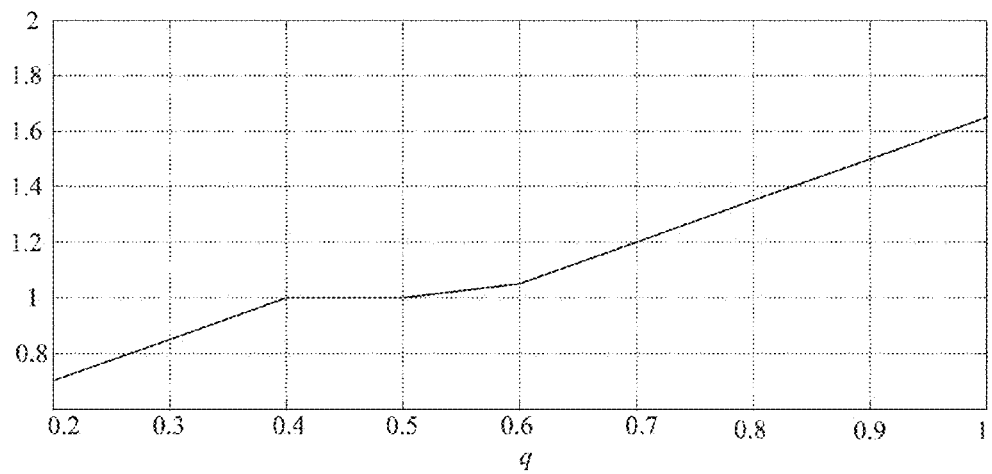
FIG. 9 is a plot of maximum absolute rate of change of flux linkage for proposed TSFs in accordance with at least one example embodiment.

As shown in FIG. 9, the maximum absolute value of rate of change of flux linkage $M_\lambda$ of the proposed family of TSFs increases as the value of q increases. It follows from equation (15) that the maximum torque-ripple-free speed will be decreased by increasing the value of q. When q=0.4, $M_\lambda$ is equal to 1 Wb/rad and the maximum torque-ripple-free speed is 2866 rpm. As noted earlier, the maximum torque-ripple-free speed for linear TSF, cubic TSF, and exponential TSF is only 152 rpm, 400 rpm, and 105 rpm, respectively. Thus, the maximum torque-ripple-free speed of the proposed TSF is close to half of the maximum speed of the SRM machine, about 7 times as high as that of cubic TSF, about 18 times as high as that of linear TSF, and about 27 times as high as that of exponential TSF. Thus, the torque-ripple-free speed range of a SRM controlled using the proposed family of TSFs may be significantly extended when compared with the torque-ripple-free speed range of a SRM controlled using a conventional TSF.

Figure 10:
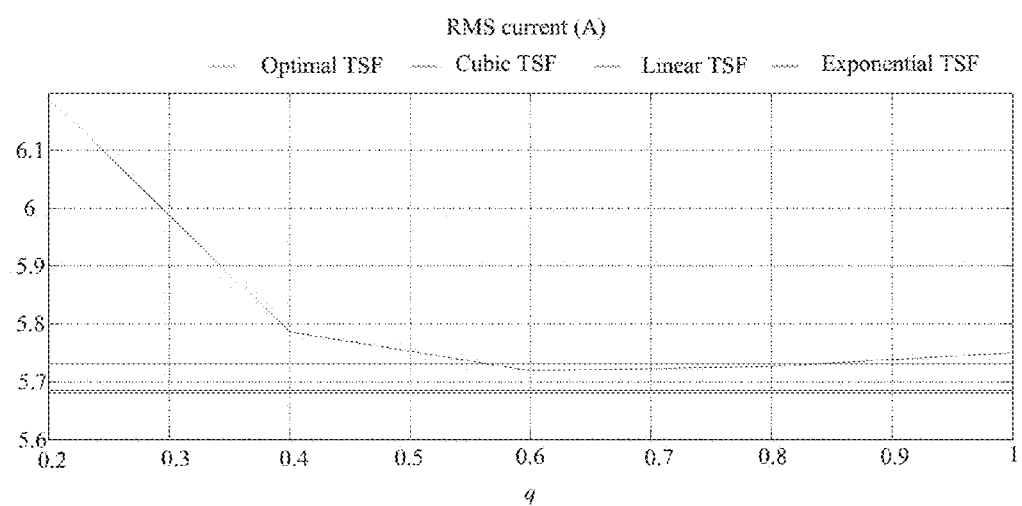
FIG. 10 is a plot comparing RMS current values for linear, cubic, and exponential TSFs and proposed TSFs in accordance with at least one example embodiment.

As shown in FIG. 10, the RMS current for the proposed TSFs is somewhat dependent on the value of q, but there does not appear to be a significant current increase compared to conventional TSFs, particularly when q is greater than about 0.4. RMS current of proposed TSFs appears to be at least somewhat higher than the RMS current values for cubic and exponential TSFs. It should be noted that the calculation of RMS value is based on reference current of different TSFs. Due to limited torque-speed capability of TSFs, the real-time current profiles may differ from the reference current profiles; examples of real-time current profile for each TSF will be discussed below.

Torque Profile Considering Magnetic Saturation

As noted above, the proposed TSF may be derived by solving the optimization problem in (28). However, the torque equation in (25) is based on the SRM operating in the linear magnetic region. When the motor is operating in the magnetic saturation region, (25) may no longer be applicable. Based on the analysis above, the torque reference defined by the proposed TSF needs to be converted to current reference in order to implement instantaneous torque control. Thus, an accurate relationship between torque profile and current at different rotor positions may be important.

For example, the torque profile for the SRM in the saturated magnetic region may be modeled by using equation (45).

$$T_{ek}(\theta, i) = \frac{a(\theta)i_k^2(\theta)}{(1 + b(\theta)i_k^3(\theta))^{\frac{1}{3}}} \quad (45)$$

where $a(\theta)$ and $b(\theta)$ are the parameters of the motor in terms of the rotor position, which need to be defined. The details of this expression are described in V. P. Vujičić, "Minimization torque ripple and copper losses in switched reluctance drive," *IEEE Trans. on Power Electron.*, vol. 27, no. 1, pp. 388-399, January 2012, and V. P. Vujičić, "Modeling of a switched reluctance machine based on the invertible torque function," *IEEE Trans. Magn.*, vol. 44, no. 9, pp. 2186-2194, September 2008.

Figure 11:
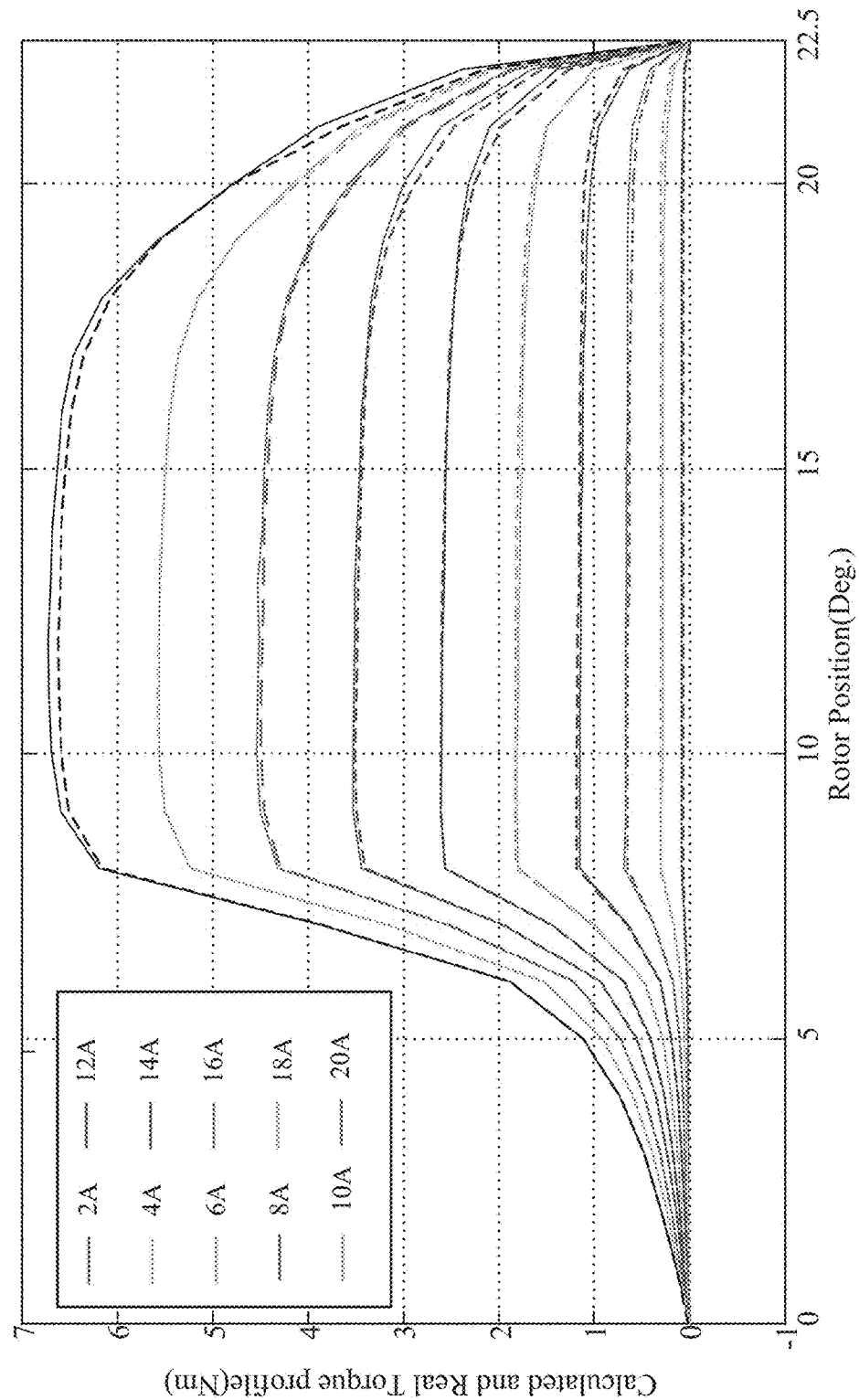
FIG. 11 is a plot comparing calculated and modeled torque profiles for proposed TSFs in accordance with at least one example embodiment.

The motor parameters $a(\theta)$ and $b(\theta)$ may be obtained by using a curve fitting tool in Matlab. FIG. 11 shows a comparison of the torque profile calculated using (45), and a torque profile modeled using Finite Element Analysis (FEA). The FEA and the calculated torque profile are denoted as solid and dashed lines, respectively. The calculated torque profiles generally correspond to the modeled torque profile in different rotor positions and current levels. Thus, equation (45) appears to be applicable in both the linear magnetic and saturated magnetic regions.

Also, the torque equation in (45) is invertible. Thus, the current reference can be obtained:

$$i_k(\theta) = \frac{T_{ek}(\theta, i)}{a(\theta)} \left( \frac{b(\theta)}{2} \sqrt{\frac{b^2(\theta)}{4} + \left(\frac{a(\theta)}{T_{ek}(\theta, i)}\right)^3} \right)^{\frac{1}{3}} \quad (46)$$

The current reference can be calculated using (46). The torque references of two phases defined by the proposed TSF can be derived and then converted to current references. Thus, a torque reference defined by the proposed TSFs (or other conventional TSFs) applies to a SRM operating either in a linear magnetic region or in a saturated magnetic region, and the application of the proposed TSFs can be extended to the magnetic saturation region.

Simulation Verification

The proposed and conventional TSFs may be compared in terms of RMS current and torque ripples by simulation. For example, a 2.3 kW 12/8 SRM simulation model may be built using Matlab/Simulink, and torque as well as inductance profiles shown in FIG. 11 may be stored in look-up tables. Hysteresis current control is applied and current hysteresis band is set to be 0.5 A. An asymmetric power electronic converter (see e.g. FIG. 2) may be used to drive the machine. The switching frequency of the asymmetric power electronic converter may be between 12 and 50 kHz. To verify the performance of the proposed TSF in both the linear magnetic region and the saturated magnetic region, torque reference is set to be 1.5 Nm and 3 Nm, respectively. When the torque reference is set to 1.5 Nm, the maximum current is 12 A and motor is operating in linear magnetic region. As the torque reference is increased to 3 Nm, the maximum current reference derived from (46) is about 15 A and the motor is operating in saturated magnetic region. In simulation, DC-link voltage is set to be 300 V. The turn on angle $\theta_{on}$ was set to 5°, and the overlapping angle $\theta_{ov}$ was set to 2.5°. Torque ripple is defined as in (17).

In some embodiments, there may be a sampling time limitation in the digital implementation of the current hysteresis controller, which may result in higher current ripples leading to higher torque ripples. Therefore, the sampling time may become an important factor in determining the torque ripples of both conventional TSFs and the proposed offline TSF. In the simulation models discussed below, the sampling time $t_{sample}$ was set to 0.1 μs. When $t_{sample}$ is set to 0.1 μs, the torque ripples are mostly contributed by the tracking performance of TSFs rather than higher sampling time and, hence, the tracking performance of the TSFs can be compared more effectively in terms of torque ripple.

Figure 12A:
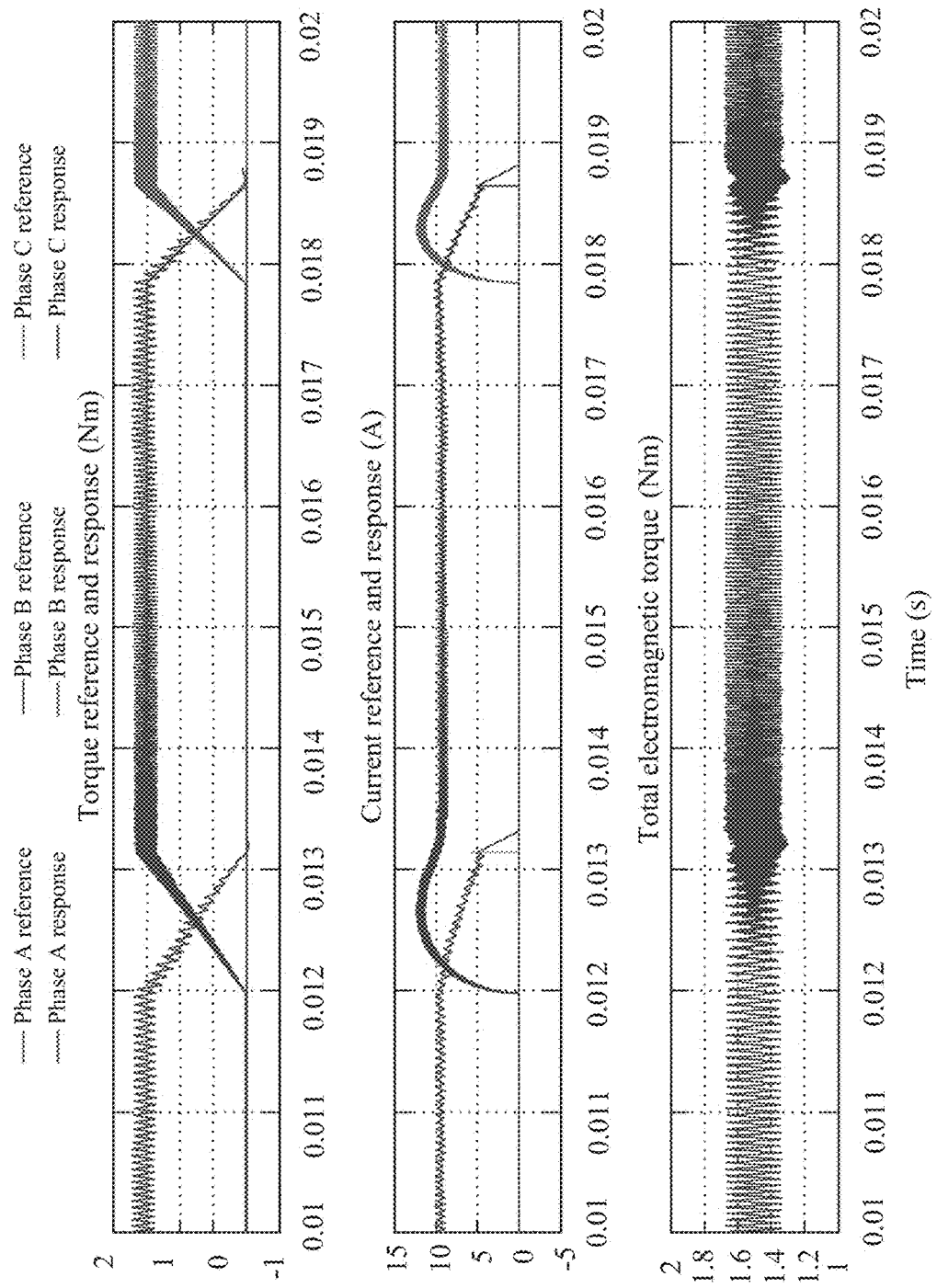
FIG. 12A shows simulation results for the linear TSF at 300 rpm ($T_{ref}=1.5$ Nm)
Figure 12B:
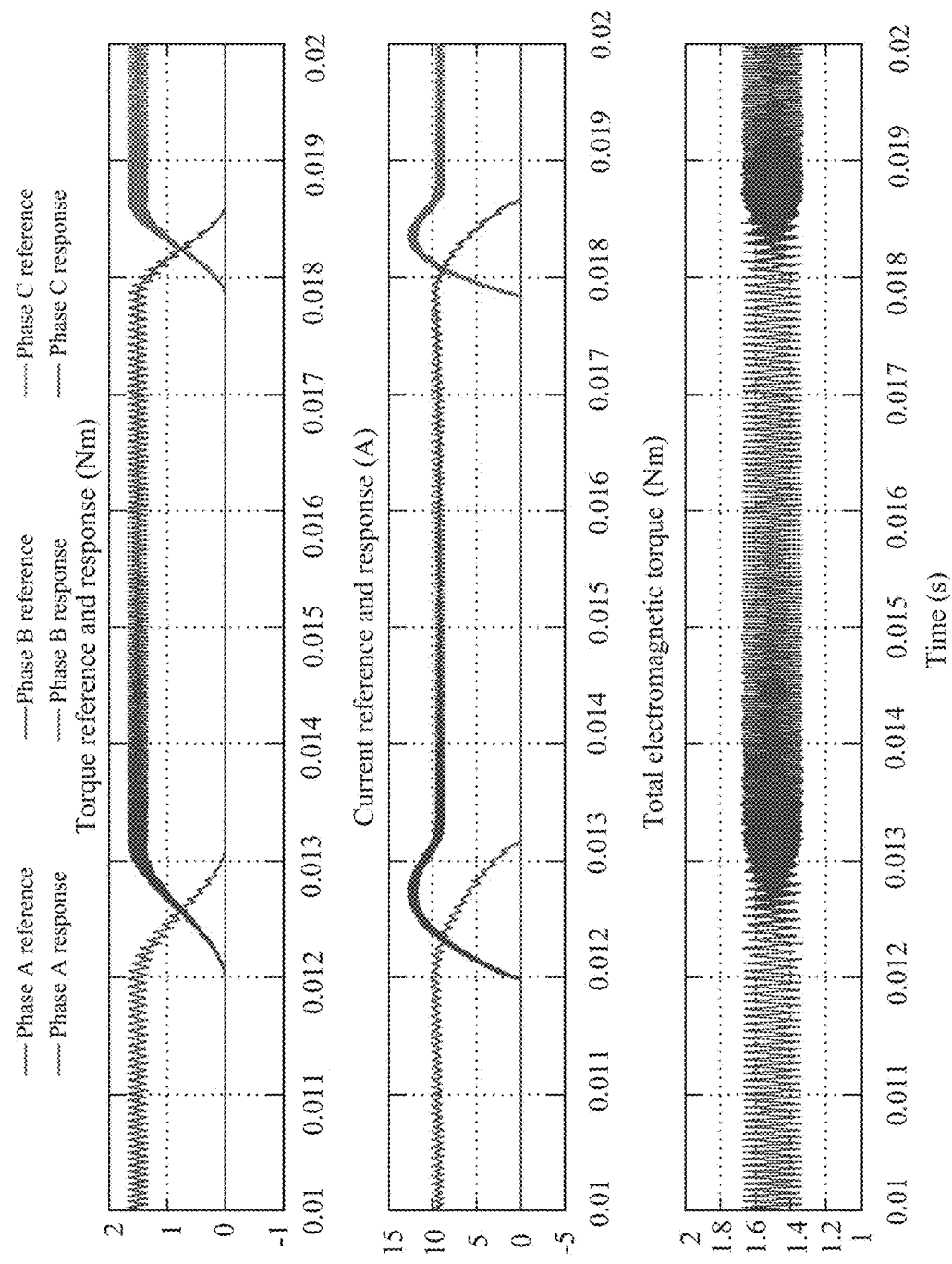
FIG. 12B shows simulation results for the cubic TSF at 300 rpm ($T_{ref}=1.5$ Nm)
Figure 12C:
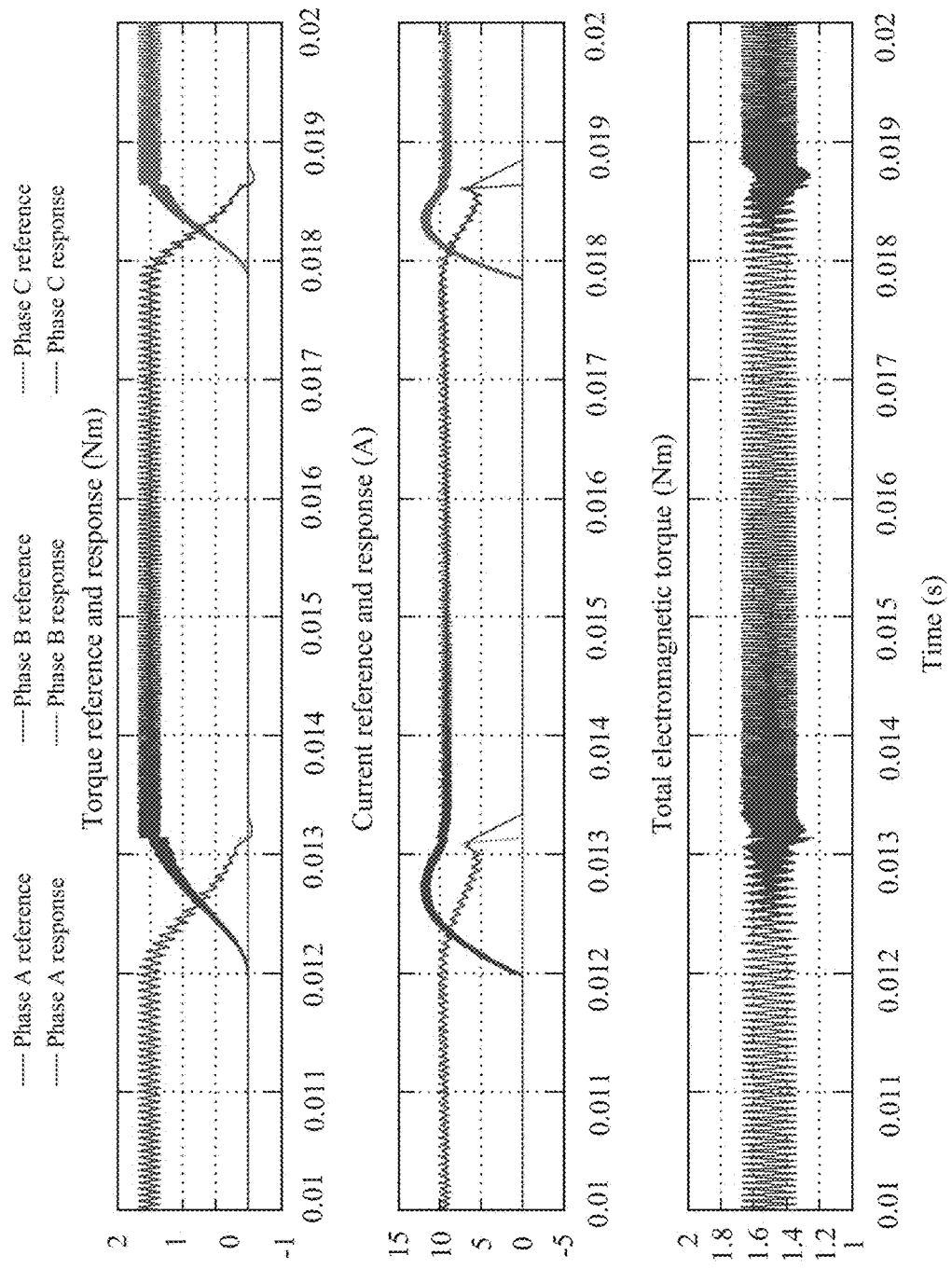
FIG. 12C shows simulation results for the exponential TSF at 300 rpm ($T_{ref}=1.5$ Nm)
Figure 12D:
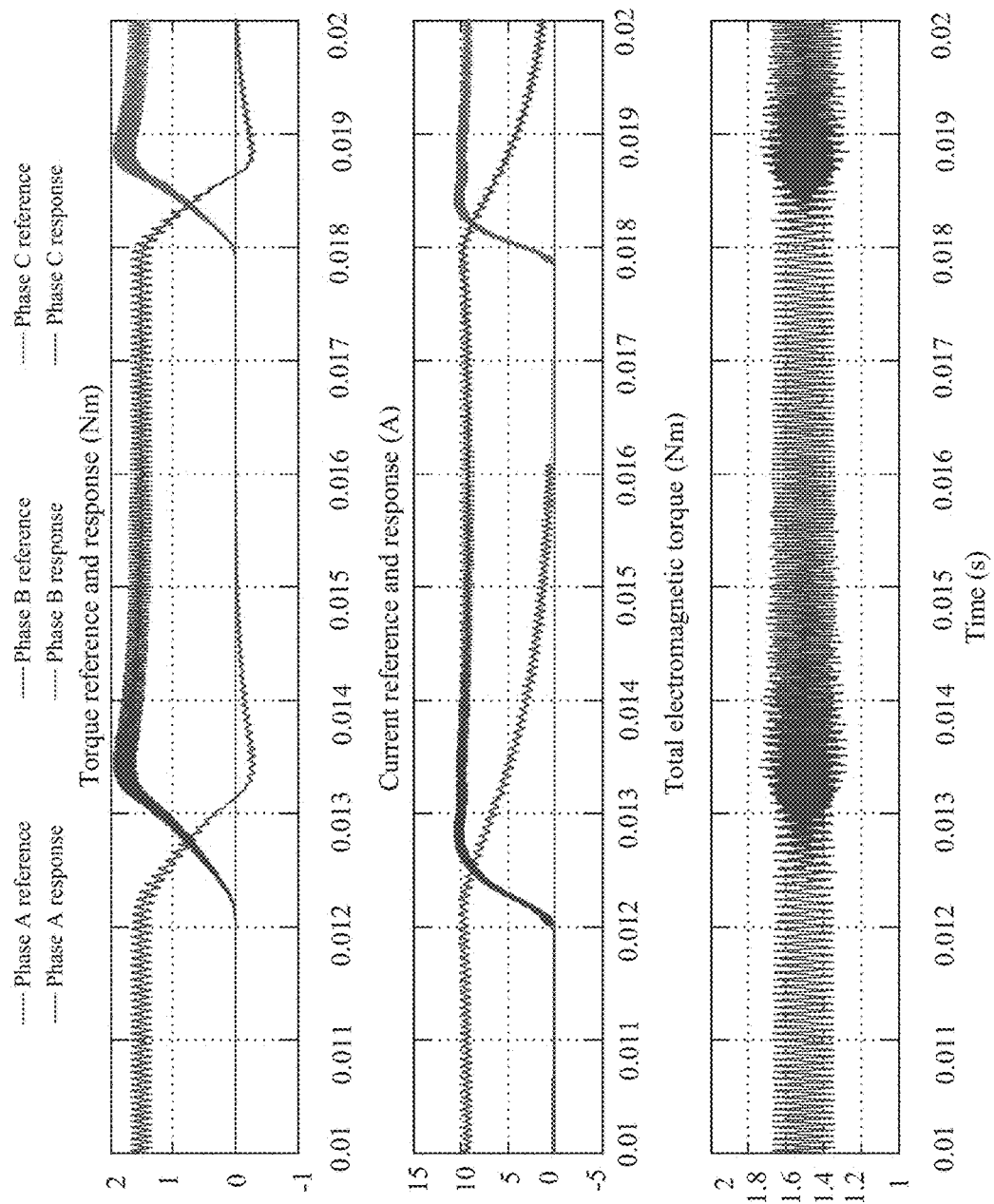
FIG. 12D shows simulation results for a proposed TSF (q=0.4) in accordance with at least one example embodiment at 300 rpm ($T_{ref}=1.5$ Nm)
Figure 12E:
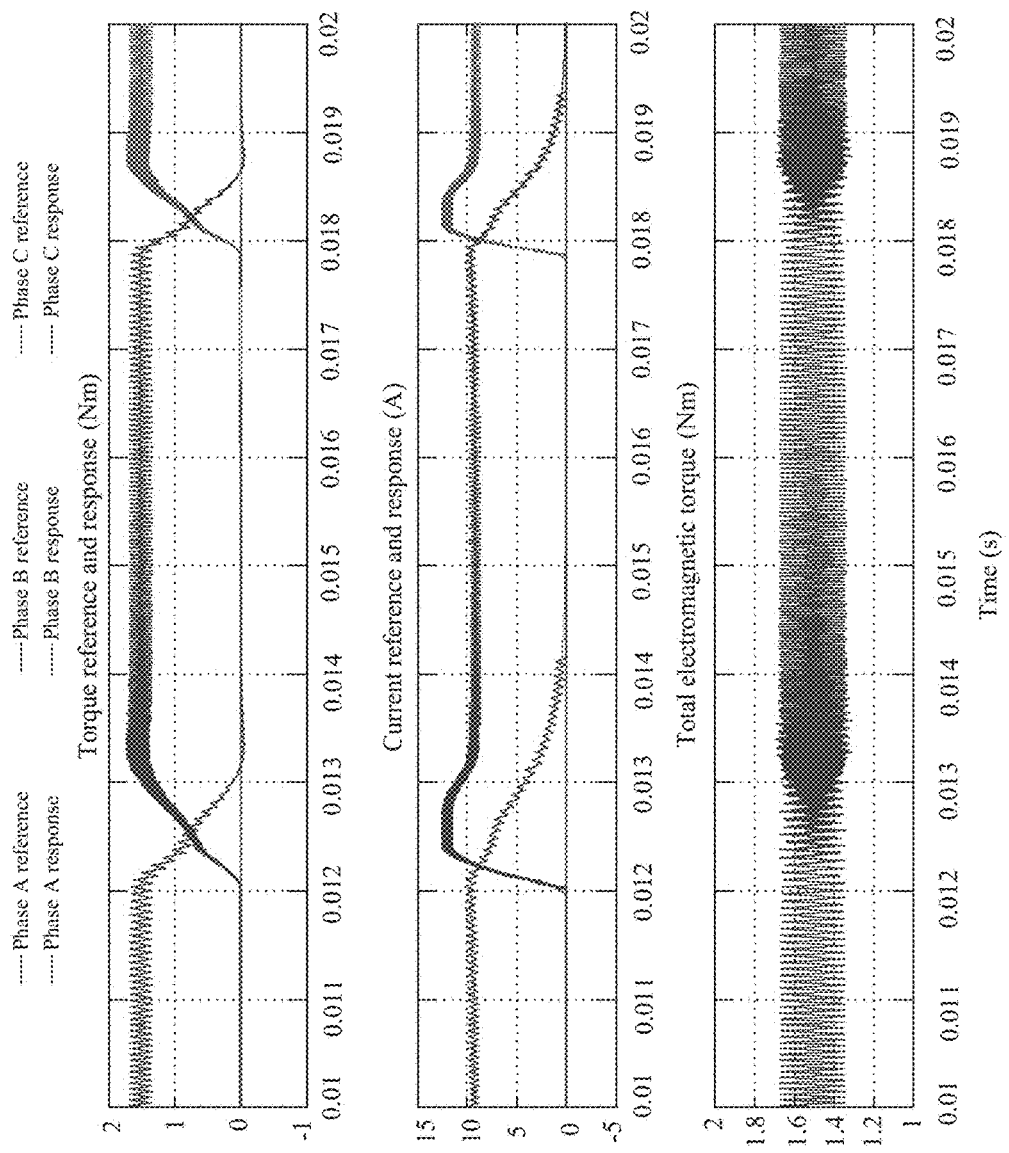
FIG. 12E shows simulation results for a proposed TSF (q=1) in accordance with at least one example embodiment at 300 rpm ($T_{ref}=1.5$ Nm)
Figure 13A:
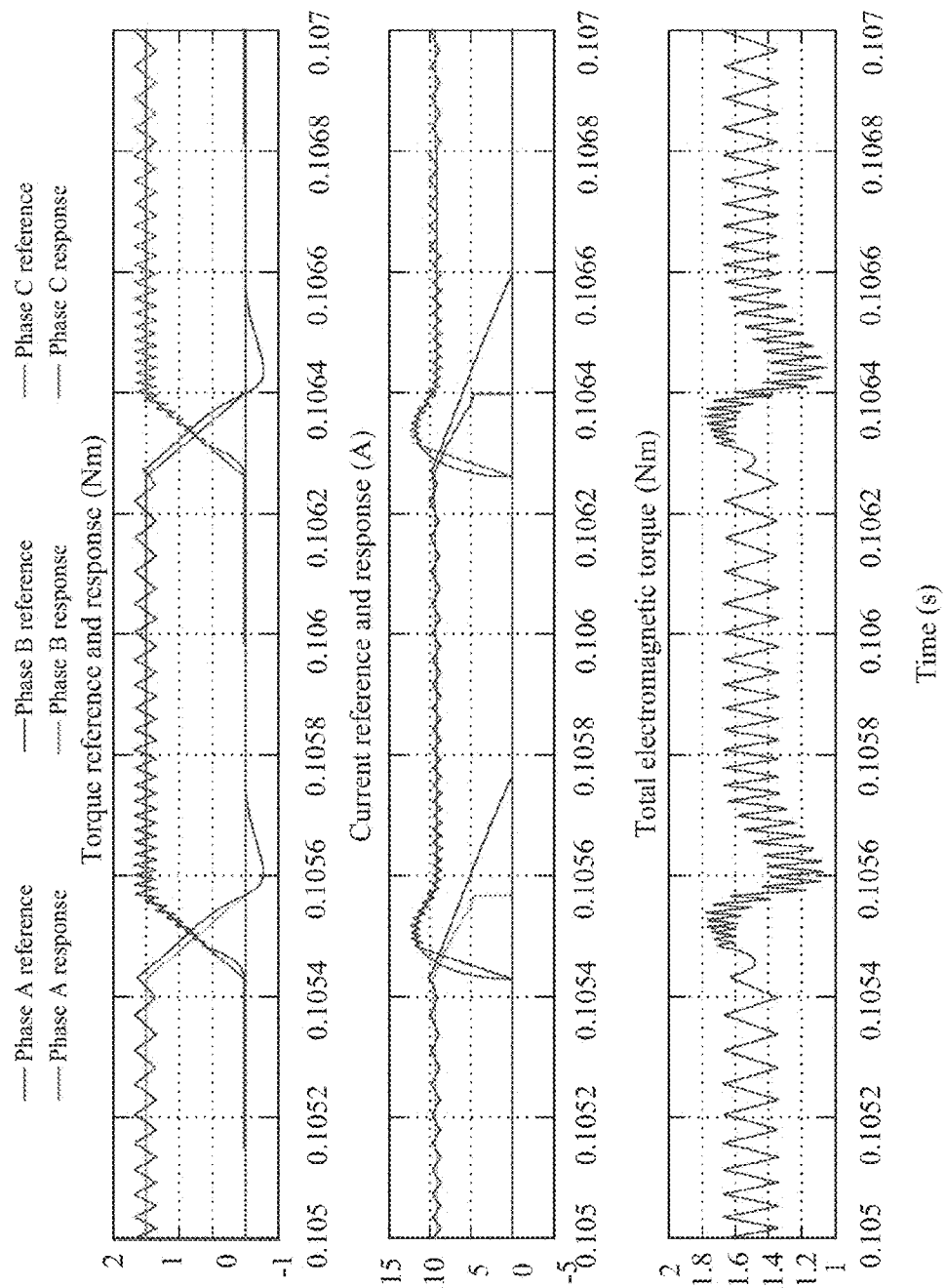
FIG. 13A shows simulation results for the linear TSF at 3,000 rpm ($T_{ref}=1.5$ Nm)
Figure 13B:
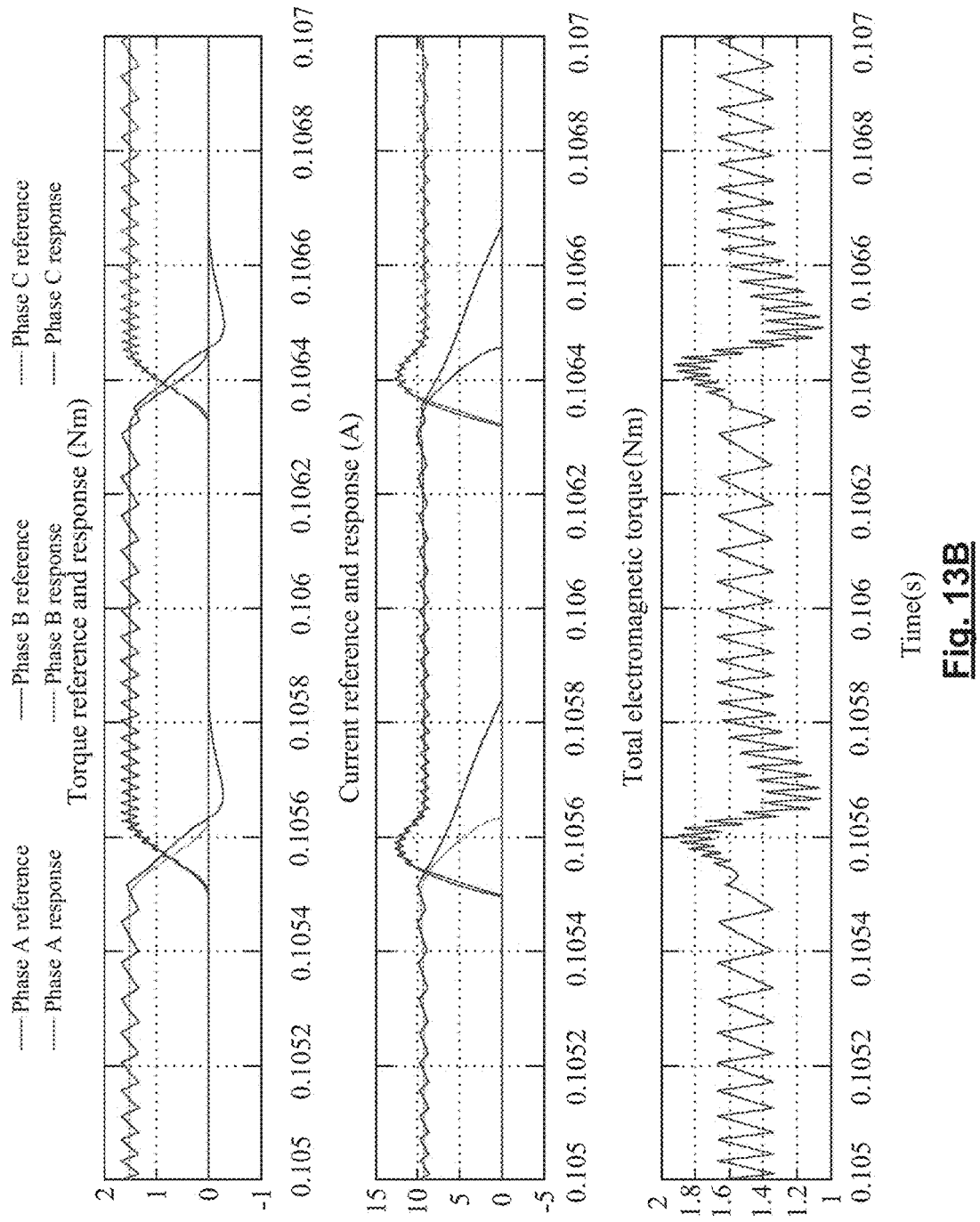
FIG. 13B shows simulation results for the cubic TSF at 3,000 rpm ($T_{ref}=1.5$ Nm)
Figure 13C:
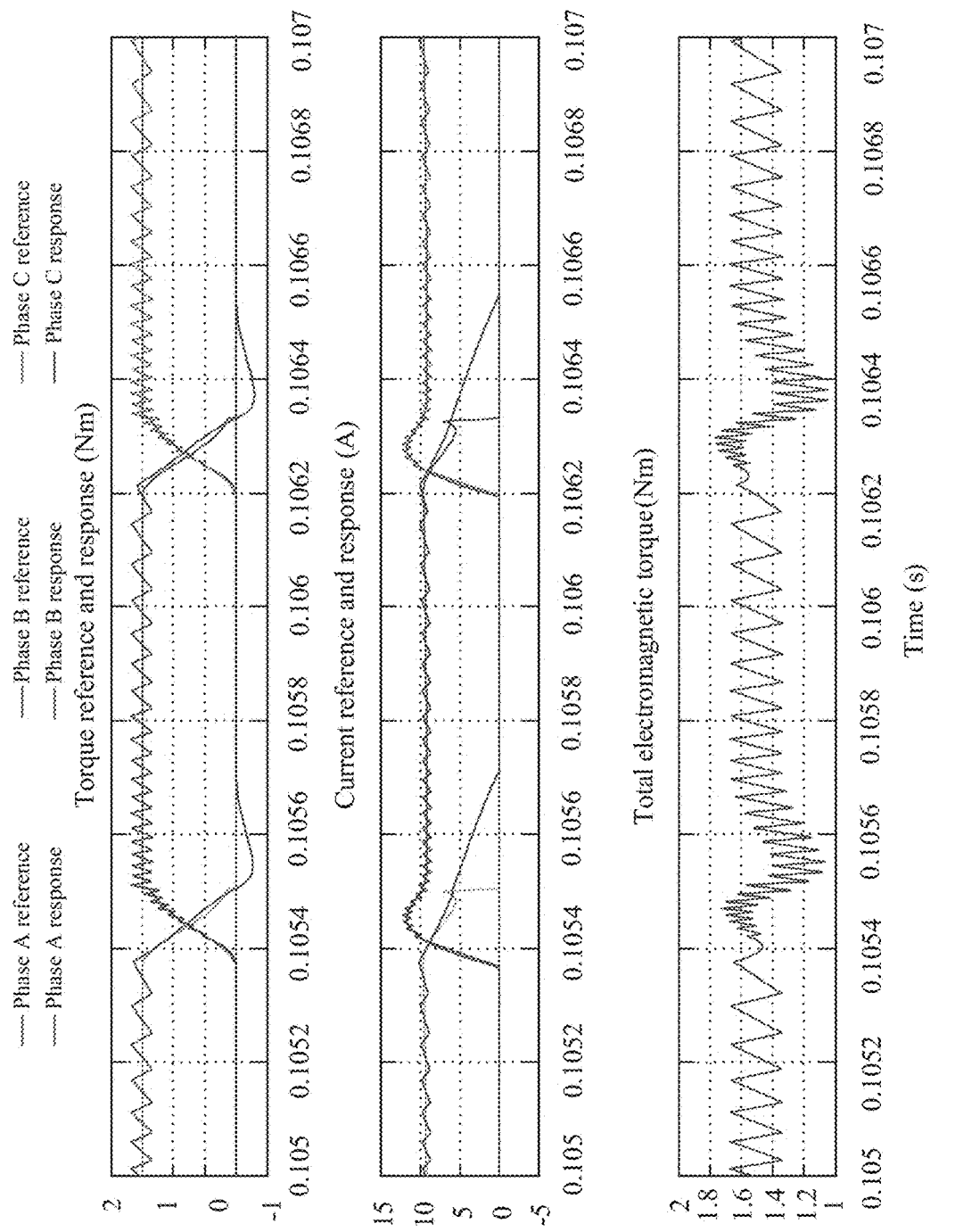
FIG. 13C shows simulation results for the exponential TSF at 3,000 rpm ($T_{ref}=1.5$ Nm)
Figure 13D:
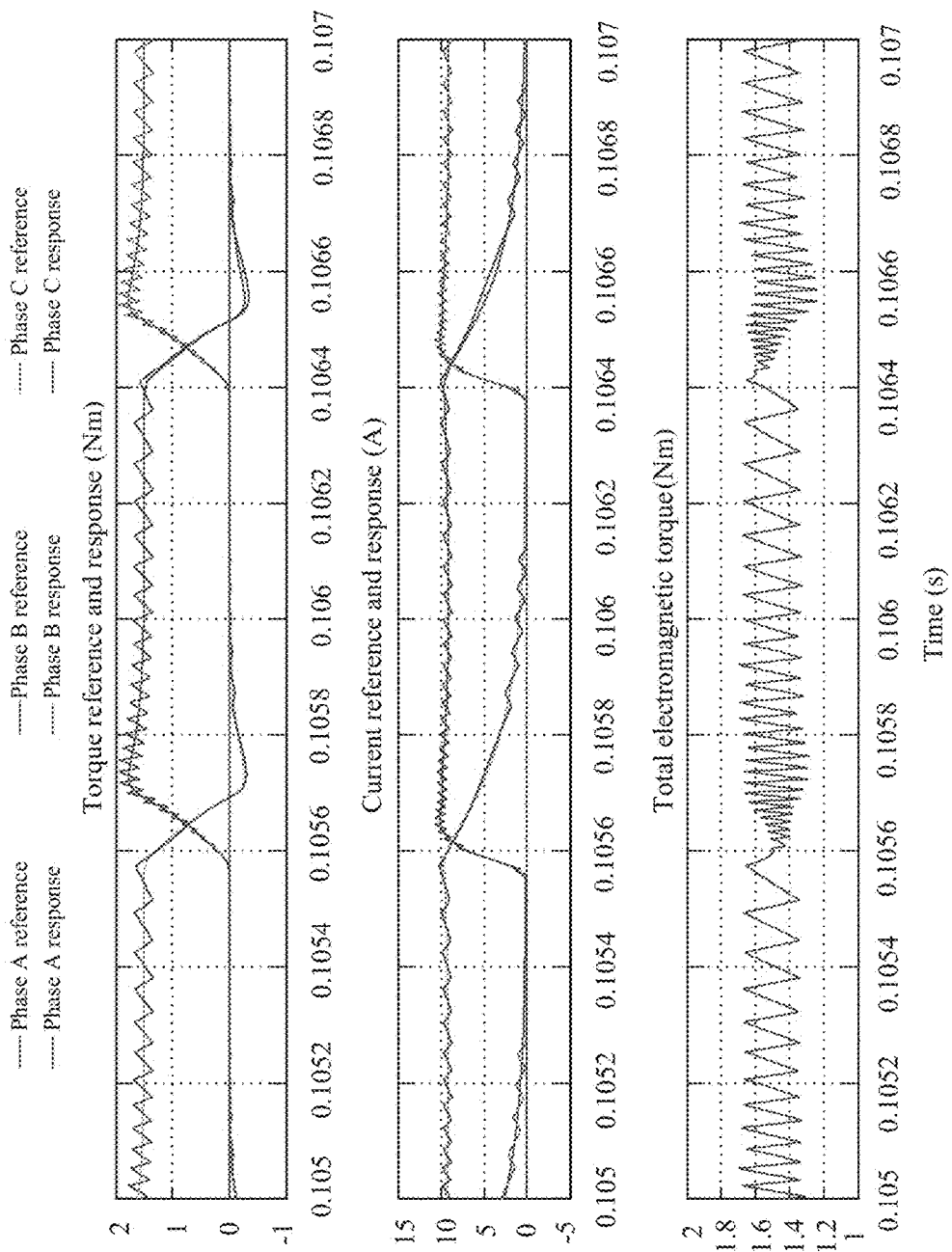
FIG. 13D shows simulation results for a proposed TSF (q=0.4) in accordance with at least one example embodiment at 3,000 rpm ($T_{ref}=1.5$ Nm)
Figure 13E:
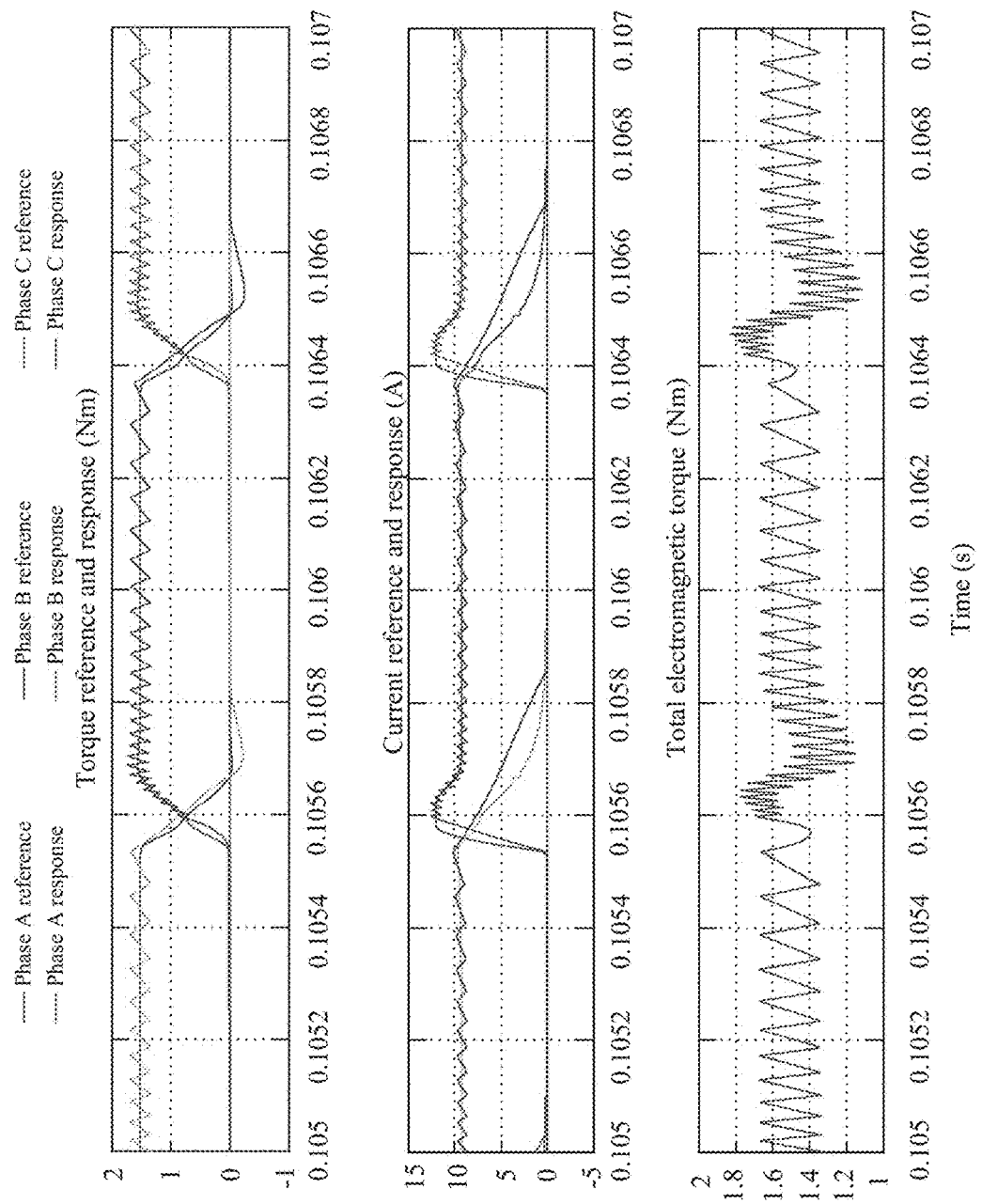
FIG. 13E shows simulation results for a proposed TSF (q=1) in accordance with at least one example embodiment at 3,000 rpm ($T_{ref}=1.5$ Nm)

FIGS. 12A-12E show simulation results for linear, cubic, exponential, and proposed TSFs (q=0.4 and q=1) at 300 rpm ($T_{ref}$=1.5 Nm). Due to current ripple introduced by the hysteresis controller, the torque ripple at one phase conduction mode is 20%. To decrease non-commutation ripples, the current hysteresis band may be reduced, leading to increased switching frequency. As discussed above, torque-ripple-free speeds of linear and exponential TSFs are both lower than 300 rpm, and thus the current references are not ideally tracked as shown in FIG. 12A and FIG. 12B. However, considering inherent 20% torque ripple, the commutation torque ripple of linear and exponential TSFs are not obvious. Proposed TSFs (q=0.4 and q=1) and cubic TSF achieve almost perfect tracking due to smoother commutation.

FIGS. 13A-13E show simulation results for linear, cubic, exponential, and proposed TSFs (q=0.4 and q=1) at 3,000 rpm ($T_{ref}$=1.5 Nm). As shown, at higher speed, the torque ripples for linear, cubic, and exponential TSFs are significantly increased. The current of outgoing phase decreases much more slowly at higher speed, and therefore negative torque is produced at the end of commutation. The torque-ripple-free speed of the proposed TSF with q=0.4 is close to 3,000 rpm, and thus the tracking precision of the proposed TSF is relatively high (e.g. the torque ripples are close to the non-commutation torque ripple). According to the analysis given above, by increasing the coefficient q of the proposed TSF, the rate of change of flux linkage increases. Among the five proposed TSFs shown in this simulation (i.e. q=0.2, q=0.4, q=0.6, q=0.8, and q=1), the TSF with q=1 has the poorest tracking ability. In other words, the proposed TSF with q=1 exhibited higher torque ripples than the proposed TSF with q=0.4.

Figure 14A:
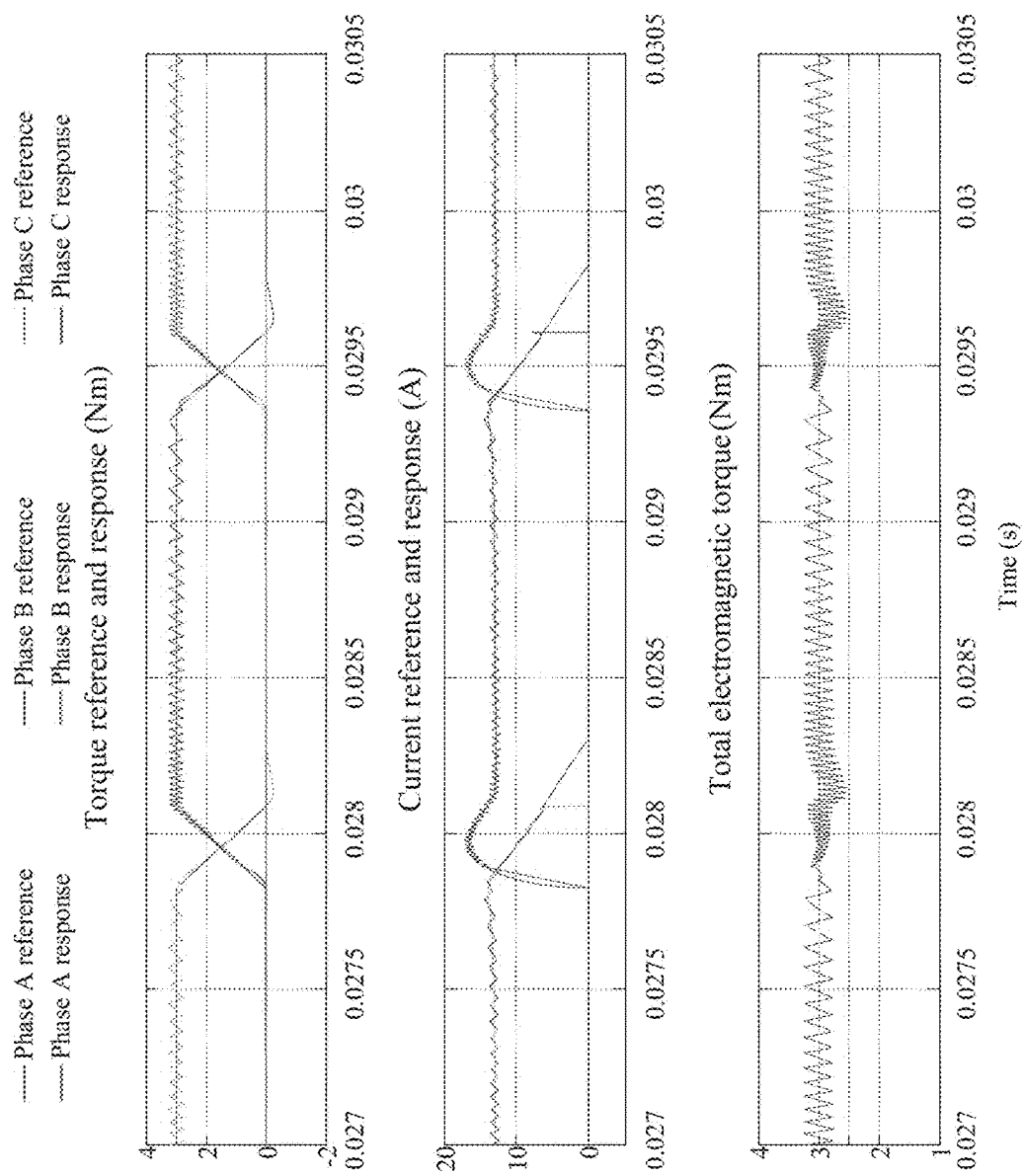
FIG. 14A shows simulation results for the linear TSF at 2,000 rpm ($T_{ref}=3$ Nm)
Figure 14B:
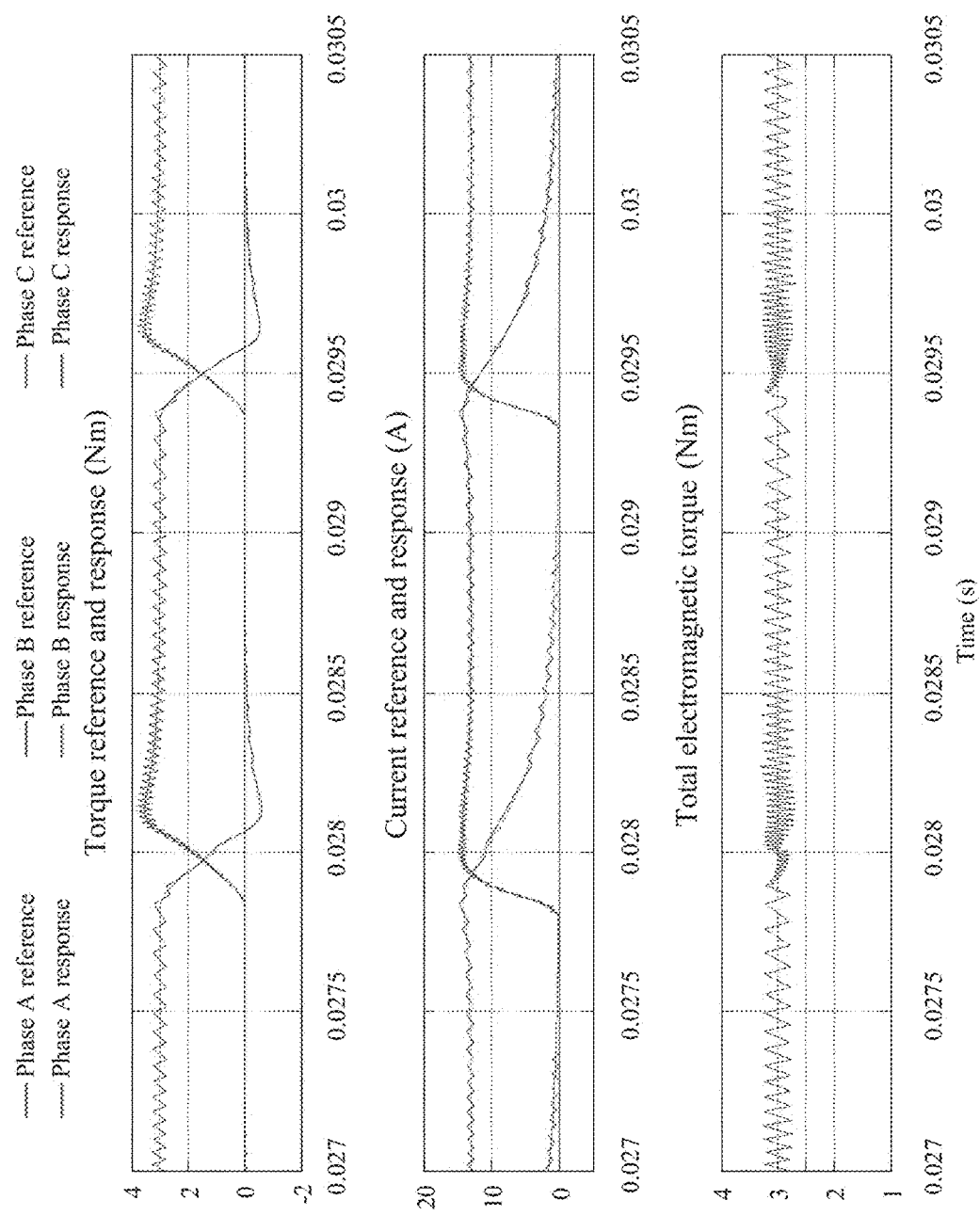
FIG. 14B shows simulation results for a proposed TSF (q=0.4) in accordance with at least one example embodiment at 2,000 rpm ($T_{ref}=3$ Nm)

FIGS. 14A-14B show simulation results for linear and proposed TSFs (q=0.4) at 2,000 rpm with $T_{ref}$=3 Nm. The torque reference was set to 3 Nm to verify the application of the proposed TSF to the saturated magnetic region. The torque ripples of linear TSF are twice as high as the proposed TSF with q=0.4. In linear TSF, negative torque is produced at the end of commutation, which decreases the average torque to 2.7 Nm. For the proposed TSF with q=0.4. at 1,800 rpm the torque tracking error of two phases appears negligible and the torque-ripple-free speed is close to 1,800 rpm. Torque-ripple free speed of the proposed TSF (with q=0.4) is decreased from 3,000 rpm to 1,800 rpm as the torque reference is increased from 1.5 Nm to 3 Nm, due to higher rate of flux linkage at higher torque outputs. Therefore, the proposed TSF (q=0.4) does not appear to exhibit deteriorated performance when the SRM is operating in the saturated magnetic region.

Figure 15:
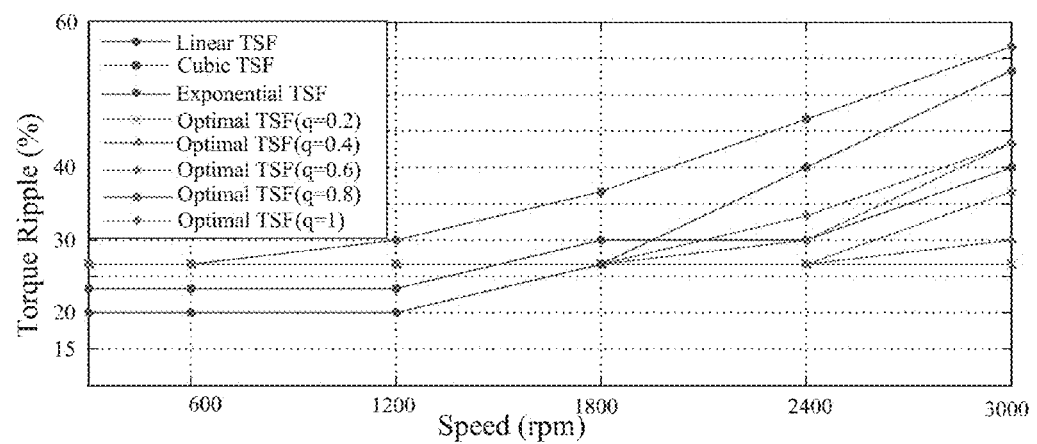
FIG. 15 shows simulation results comparing torque ripple at different motor speeds for linear TSF, cubic TSF, exponential TSF, and proposed TSF (for q=0.2, q=0.4, q=0.6, q=0.8, and q=1) with $T_{ref}=1.5$ Nm.

FIG. 15 shows simulation results comparing torque ripple at different motor speeds for linear TSF, cubic TSF, exponential TSF, and the proposed TSF (for q=0.2, q=0.4, q=0.6, q=0.8, and q=1) with $T_{ref}$=1.5 Nm.

Figure 16:
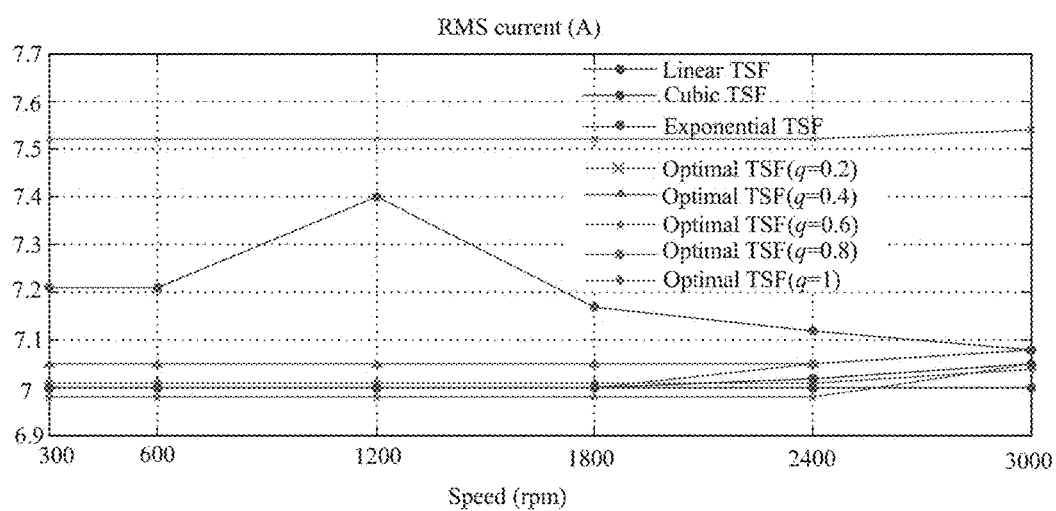
FIG. 16 shows simulation results comparing RMS current at different motor speeds for linear TSF, cubic TSF, exponential TSF, and proposed TSF (for q=0.2, q=0.4, q=0.6, q=0.8, and q=1) with $T_{ref}=1.5$ Nm.

FIG. 16 shows simulation results comparing RMS current at different motor speeds for linear TSF, cubic TSF, exponential TSF, and the proposed TSF (for q=0.2, q=0.4, q=0.6, q=0.8, and q=1) with $T_{ref}$=1.5 Nm.

A similar comparison may be applied for the SRM operating in the saturated magnetic region (e.g. $T_{ref}$=3 Nm). The torque ripples of linear, cubic, and exponential TSFs at 3,000 rpm are almost twice as high as those at 300 rpm. The proposed TSFs show much lower torque ripple when q is less than 0.6 at 3,000 rpm. Therefore, considering torque-speed capability, proposed TSFs with q=0.4 and q=0.6 appear promising. It should be noted that the proposed TSFs show a slight increase in torque ripple at lower speed, which is caused by inherent current ripple of the hysteresis controller. By decreasing the current band of the hysteresis controller, the differences in torque ripple at lower speed can be further reduced. However, as shown in FIG. 16, the proposed TSF with q=0.2 shows much higher RMS current than other TSFs. For q=0.4 and q=0.6, the proposed TSFs show comparable RMS current as the linear and cubic TSFs with much lower commutation torque ripple. Therefore, their overall performance can be characterized as being an improvement to linear and cubic TSFs. Considering torque-speed capability, the proposed TSF with q=0.4 appears to be a promising choice for torque ripple reduction with relatively high efficiency.

Experimental Results

Figure 17:
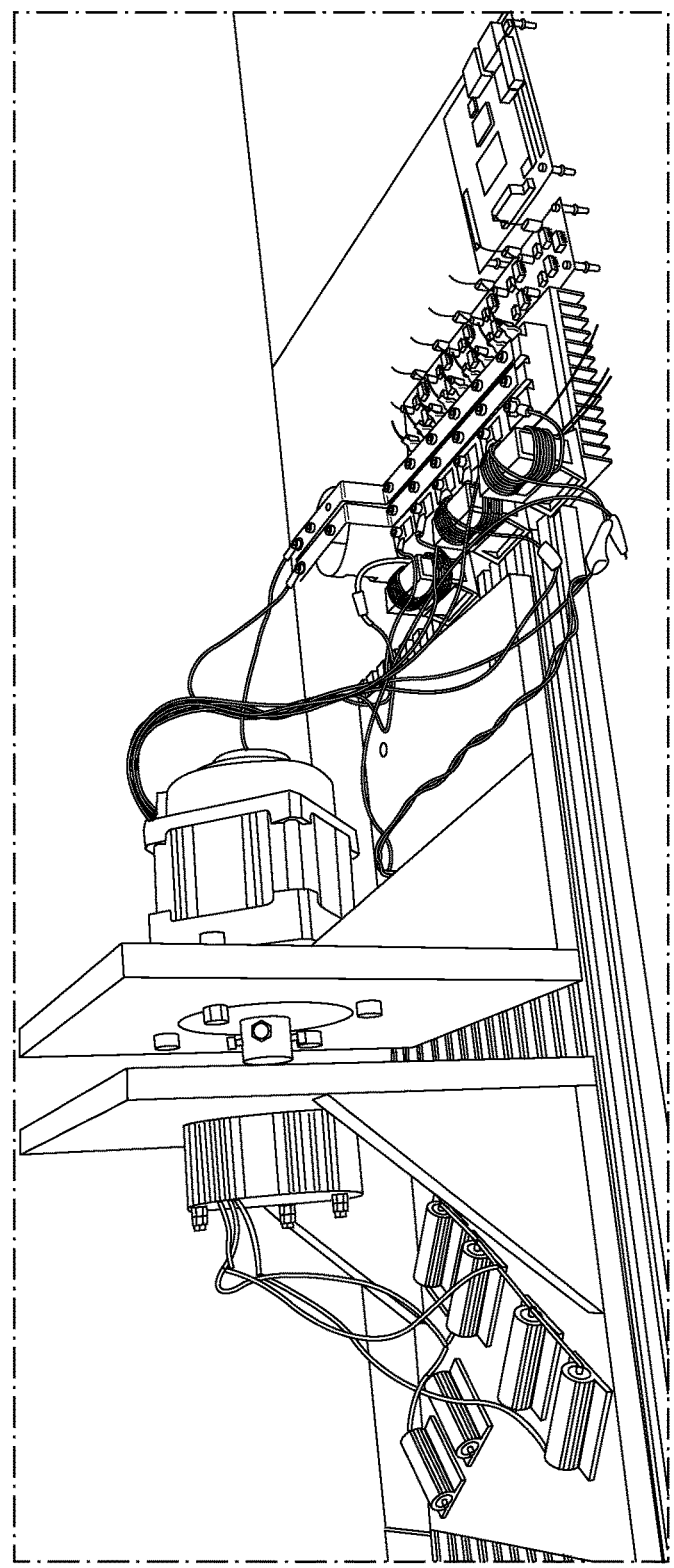
FIG. 17 shows experimental equipment used to test proposed TFSs.

The proposed TSF with q=0.4 was verified in a 2.3 kW 6000 rpm 12/8 SRM shown in FIG. 17. An EP3C25Q240 FPGA (available from Altera Corporation) was used for digital implementation of the proposed TSFs. The current hysteresis band was set to be 0.5 A. The torque-current-rotor position characteristics were stored as look up tables in the FPGA. Torque was estimated from this look-up table by measuring the phase current and rotor position, and converted into an analog signal using a digital-to-analog conversion chip in the hardware. The proposed TSF was obtained and converted to current reference offline for different values for q (e.g. q=0.2, q=0.4, q=0.6, q=0.8, and q=1). These current references were stored in another look-up table as a function of the rotor position in the FPGA. The maximum torque-ripple-free speed may be determined by the DC link voltage. During the experiment, DC-link voltage was set to 300 V to evaluate the torque speed performance of the SRM.

According to the theoretical analysis and simulation above, the maximum torque-ripple-free speed is expected to be about 2,800 rpm when the torque reference is 1.5 Nm, and about 1,800 rpm when the torque reference is 3 Nm. In this experiment, DC-link voltage is set to 300 V and the torque reference is set to 1.5 Nm and 3 Nm.

As noted, in the simulation models discussed above, the sampling time $t_{sample}$ was set to 0.1 μs. Due to the limitation of the digital controller hardware, the sampling time was set to 5 μs in the experiments discussed below. Further simulations were conducted with $t_{sample}$ set to 5 μs. These further simulations yielded results consistent with those discussed herein, indicating that the comparison between the experimental results discussed below and the simulation results discussed above is reasonable.

Figure 18:
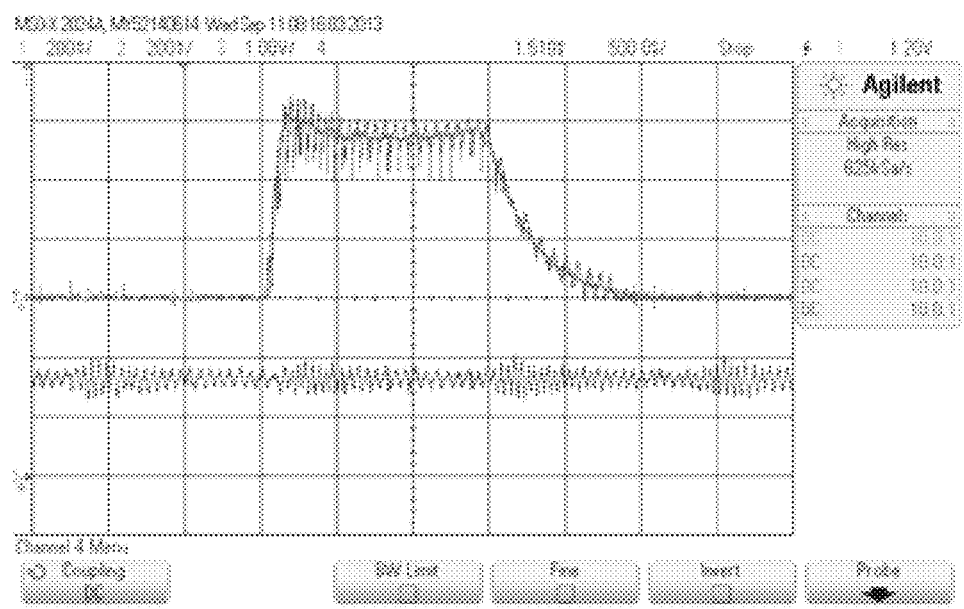
FIG. 18 shows experimental results for a proposed TSF (q=0.4) at 1,800 rpm ($U_{dc}=300$ V, $T_{ref}=1.5$ Nm)

FIG. 18 shows current reference, current response, and estimated torque at 1800 rpm when the torque reference is set to 1.5 Nm. The motor is working in the linear magnetic region. The proposed TSF with q=0.4 exhibited near-perfect tracking, and output torque was almost flat (ignoring the torque ripple of current hysteresis controller).

Figure 19:
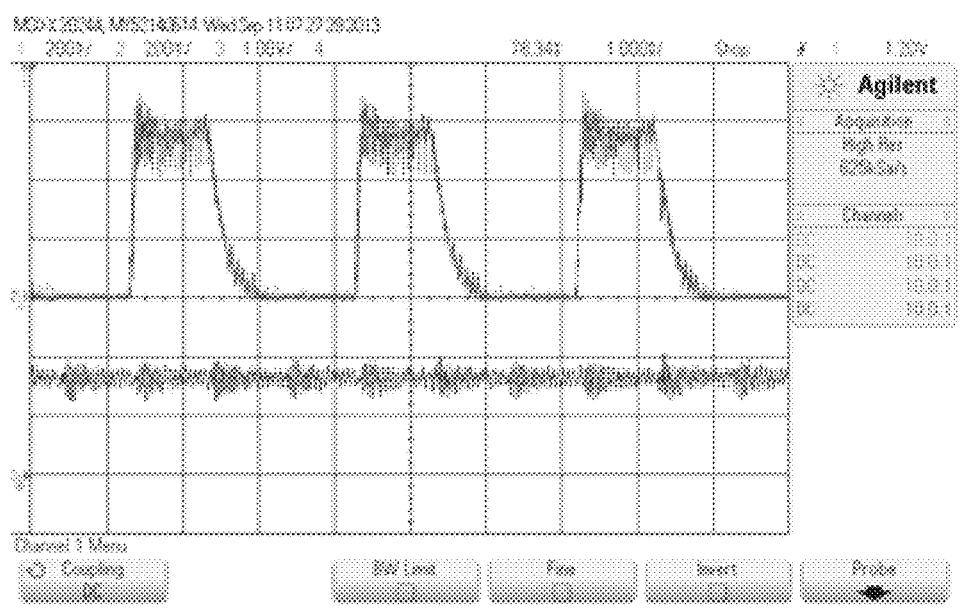
FIG. 19 shows experimental results for a proposed TSF (q=0.4) at 2,500 rpm ($U_{dc}=300$ V, $T_{ref}=1.5$ Nm)
Figure 20:
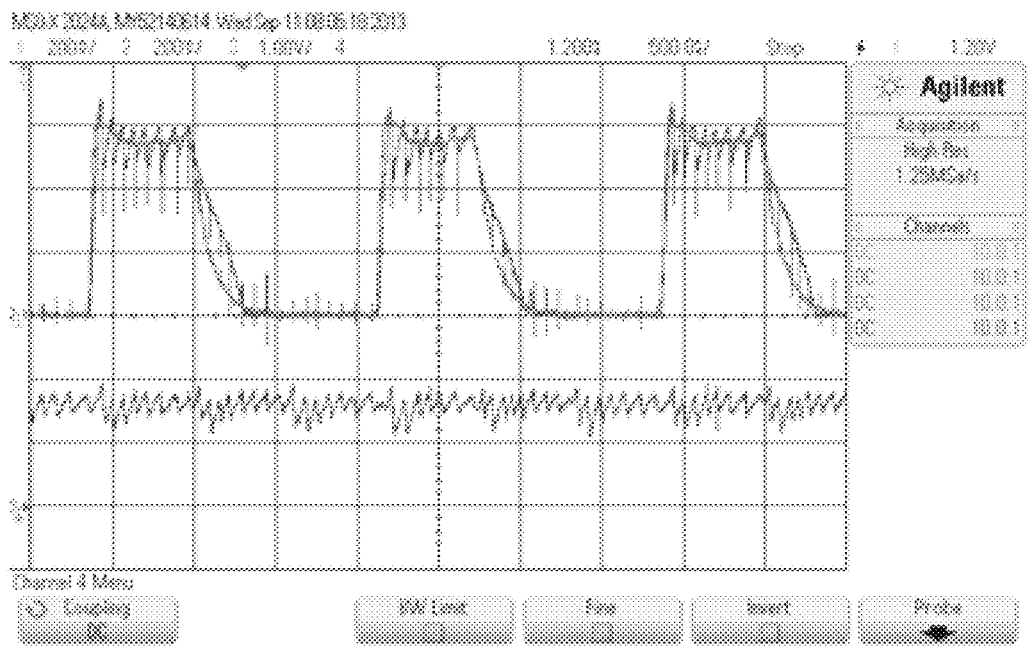
FIG. 20 shows experimental results for a proposed TSF (q=0.4) at 4,200 rpm ($U_{dc}=300$ V, $T_{ref}=1.5$ Nm)

FIG. 19 shows current reference, current response, and estimated torque at 2,500 rpm, which is close to the maximum torque-ripple-free speed when the torque reference is set to 1.5 Nm. The proposed TSF with q=0.4 still achieved near-perfect tracking and torque ripples are kept relatively small. FIG. 20 shows current reference, current response, and estimated torque at 4,200 rpm when the torque reference is set to 1.5 Nm. Tracking error in one phase current becomes obvious and torque ripple increases. Therefore, the maximum torque-ripple-free speed of the machine is about 2,500 rpm by experiment which matches the value provided by both theoretical analysis and simulation.

Figure 21:
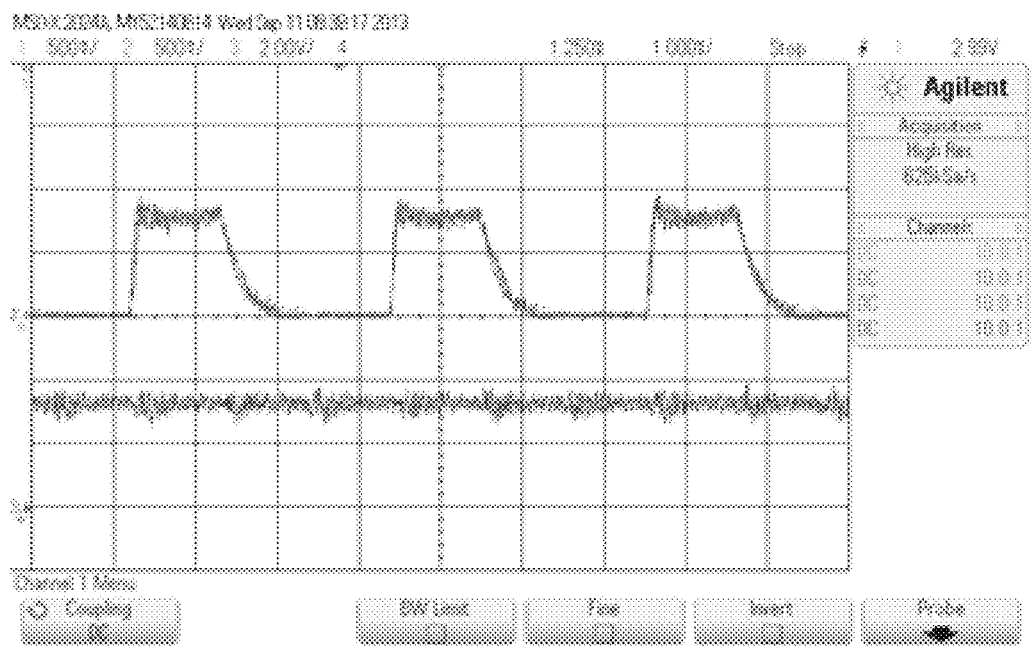
FIG. 21 shows experimental results for a proposed TSF (q=0.4) at 2,300 rpm ($U_{dc}=300$ V, $T_{ref}=3$ Nm).

FIG. 21 shows current reference, current response, and estimated torque at 2,300 rpm when the torque reference is set to 3 Nm. Only small tracking error of one phase was observed and torque ripple was still limited. Therefore, experimentally the maximum torque-ripple-free speed of the machine appears to be slightly less than 2,300 rpm, which is generally consistent with the value predicted by both theoretical analysis and simulation (i.e. 1,800 RPM).

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that variations are possible in variant implementations and embodiments.

The invention claimed is:

1. A method for controlling a switched reluctance motor, the method comprising:
receiving a reference torque $T_{e\_ref}$;
receiving an indication of a present rotor position θ for the switched reluctance motor;
determining at least one of:
a reference current $i_{e\_ref(k-1)}$ for a $(k-1)^{th}$ phase,
a reference current $i_{e\_ref(k)}$ for a $(k)^{th}$ phase, and
a reference current $i_{e\_ref(k+1)}$ for a $(k+1)^{th}$ phase; and
outputting the determined at least one reference current to a current controller operatively coupled to the switched reluctance motor for controlling the switched reluctance motor,
wherein the determined at least one reference current is based on an objective function comprising:

$$\min J = mRi_{k-1}^2(\theta) + nRi_k^2(\theta) + s\left[\frac{i_{k-1}(\theta) - i_{k-1}(\theta_0)}{\Delta\theta}\right]^2 + t\left[\frac{i_k(\theta) - i_k(\theta_0)}{\Delta\theta}\right]^2$$

subject to:

$$\frac{1}{2}\frac{\partial L(\theta, i_{k-1})}{\partial \theta}i_{k-1}^2(\theta) + \frac{1}{2}\frac{\partial L(\theta, i_k)}{\partial \theta}i_k^2(\theta) = T_{e\_ref},$$

$i_{k-1} \leq I_{max}$, and $i_k \leq I_{max}$;

wherein:
$\theta_0$ is an indication of a previous rotor position for the switched reluctance motor,
$i_{k-1}(\theta_0)$ is a reference current for an outgoing phase at the previous rotor position $\theta_0$,
$i_{k-1}(\theta)$ is a reference current for the outgoing phase at the present rotor position θ,
$i_k(\theta_0)$ is a reference current for an incoming phase at the previous rotor position $\theta_0$,
$i_k(\theta)$ is a reference current for the incoming phase at the present rotor position θ,

Δθ=θ-θ$_0$,

R represents the resistance of the switched reluctance motor,
$L(\theta, i_k)$ is an incremental inductance for the switched reluctance motor for the incoming phase at the present rotor position θ,
$L(\theta, i_{k-1})$ is an incremental inductance for the switched reluctance motor for the outgoing phase at the present rotor position θ,
$I_{max}$ is an allowable peak current for the switched reluctance motor, and
m, n, s, and t are Tikhonov factors.

2. The method of claim 1, wherein determining the at least one reference current comprises:
determining at least one of:
a reference torque $T_{e\_ref(n-1)}$ for a $(k-1)^{th}$ phase,
a reference torque $T_{e\_ref(n)}$ for a $(k)^{th}$ phase, and
a reference torque $T_{e\_ref(n+1)}$ for a $(k+1)^{th}$ phase; and
using the determined at least one reference torque, the present rotor position θ for the switched reluctance motor, and a set of torque-current-rotor position characteristics to determine the at least one reference current.

3. A switched reluctance motor system comprising:
a switched reluctance motor; and
a control system operatively coupled to a current controller for the switched reluctance motor, the control system configured to:
receive a reference torque $T_{e\_ref}$;

receive an indication of a present rotor position θ for the switched reluctance motor;
determine at least one of:
a reference current $i_{e\_ref(k-1)}$ for a $(k-1)^{th}$ phase,
a reference current $i_{e\_ref(k)}$ for a $(k)^{th}$ phase, and
a reference current $i_{e\_ref(k+1)}$ for a $(k+1)^{th}$ phase; and
output the determined at least one reference current to the current controller for controlling the switched reluctance motor,
wherein the determined at least one reference current is based on an objective function comprising:

$$\min J = mRi_{k-1}^2(\theta) + nRi_k^2(\theta) + s\left[\frac{i_{k-1}(\theta) - i_{k-1}(\theta_0)}{\Delta\theta}\right]^2 + t\left[\frac{i_k(\theta) - i_k(\theta_0)}{\Delta\theta}\right]^2$$

subject to:

$$\frac{1}{2}\frac{\partial L(\theta, i_{k-1})}{\partial \theta}i_{k-1}^2(\theta) + \frac{1}{2}\frac{\partial L(\theta, i_k)}{\partial \theta}i_k^2(\theta) = T_{e\_ref},$$

$i_{k-1} \le I_{max}$, and $i_k \le I_{max}$;

wherein:
$\theta_0$ is an indication of a previous rotor position for the switched reluctance motor,
$i_{k-1}(\theta_0)$ is a reference current for an outgoing phase at the previous rotor position $\theta_0$,
$i_{k-1}(\theta)$ is a reference current for the outgoing phase at the present rotor position θ,
$i_k(\theta_0)$ is a reference current for an incoming phase at the previous rotor position $\theta_0$,
$i_k(\theta)$ is a reference current for the incoming phase at the present rotor position θ,
$\Delta\theta = \theta - \theta_0$,
R represents the resistance of the switched reluctance motor,
$L(\theta, i_k)$ is an incremental inductance for the switched reluctance motor for the incoming phase at the present rotor position θ,
$L(\theta, i_{k-1})$ is an incremental inductance for the switched reluctance motor for the outgoing phase at the present rotor position θ,
$I_{max}$ is an allowable peak current for the switched reluctance motor, and
m, n, s, and t are Tikhonov factors.

4. The switched reluctance motor system of claim 3, wherein the control system is configured to determine the at least one reference current by:
determining at least one of:
a reference torque $T_{e\_ref(n-1)}$ for a $(k-1)^{th}$ phase,
a reference torque $T_{e\_ref(n)}$ for a $(k)^{th}$ phase, and
a reference torque $T_{e\_ref(n+1)}$ for a $(k+1)^{th}$ phase; and
using the determined at least one reference torque, the present rotor position θ for the switched reluctance motor, and a set of torque-current-rotor position characteristics to determine the at least one reference current.

* * * * *